United States Patent
Tidestav et al.

(10) Patent No.: US 10,736,004 B2
(45) Date of Patent: Aug. 4, 2020

(54) METHODS AND DEVICES FOR CONTROLLING HANDOVER PROCEDURES IN A WIRELESS COMMUNICATION NETWORK

(71) Applicant: Telefonaktiebolaget LM Ericsson (publ), Stockholm (SE)

(72) Inventors: Claes Tidestav, Bålsta (SE); Rui Fan, Beijing (CN); Andres Reial, Malmö (SE); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/481,924

(22) PCT Filed: Jan. 9, 2018

(86) PCT No.: PCT/SE2018/050014
§ 371 (c)(1),
(2) Date: Jul. 30, 2019

(87) PCT Pub. No.: WO2018/143863
PCT Pub. Date: Aug. 9, 2018

(65) Prior Publication Data
US 2020/0045597 A1  Feb. 6, 2020

(30) Foreign Application Priority Data

Jan. 31, 2017  (WO) ............... PCT/CN2017/072795

(51) Int. Cl.
*H04W 36/30* (2009.01)
*H04W 36/00* (2009.01)

(52) U.S. Cl.
CPC ... *H04W 36/0072* (2013.01); *H04W 36/0058* (2018.08); *H04W 36/0085* (2018.08); *H04W 36/00835* (2018.08)

(58) Field of Classification Search
CPC ......... H04W 36/0072; H04W 36/0085; H04W 36/00835; H04W 36/0058
See application file for complete search history.

(56) References Cited

U.S. PATENT DOCUMENTS

2010/0317345 A1* 12/2010 Futaki ................ H04W 52/02
455/436
2012/0190364 A1* 7/2012 Wu ...................... H04W 24/10
455/436

(Continued)

FOREIGN PATENT DOCUMENTS

WO    2018053748 A1    3/2018

OTHER PUBLICATIONS

Huawei et al., "UL Based Mobility in RRC_Inactive", 3GPP TSG-RAN WG2 Meeting #96, Reno, USA, Nov. 14, 2016, pp. 1-16, R2-168566, 3GPP.

*Primary Examiner* — Nathan S Taylor
(74) *Attorney, Agent, or Firm* — Coats + Bennett, PLLC

(57) ABSTRACT

Disclosed is methods, devices and computer programs for controlling an uplink measurement procedure. There is in particular disclosed a method performed by a source access network node (1) in a wireless communication network for controlling an uplink measurement procedure for signals transmitted from a User Equipment (2), UE (2), to at least one candidate access network node (3). The method comprises providing (S1) a representation of first uplink resource to the UE (2) and the at least one candidate access network node (3), the first uplink resource to be used for transmission of a signal by the UE (2) for the at least one candidate access network node (3) to perform measurements on. The method also comprises the step of providing (S2), based on an indication that no measurement was performed by a specific candidate access network node (3) on a signal transmitted using the uplink resource, a representation of a second (Continued)

uplink resource to the UE (2) and to the specific candidate access network node (3). A corresponding device is also disclosed. It is also disclosed corresponding methods performed by a UE and a candidate access network node and devices and computer programs related thereto. It is further disclosed a method performed by a source access network node for selecting a target access network node based on the disclosed method for controlling the uplink measurement procedure.

20 Claims, 17 Drawing Sheets

(56) References Cited

U.S. PATENT DOCUMENTS

| | | | |
|---|---|---|---|
| 2013/0301442 A1* | 11/2013 | Martin | H04W 36/0061 370/252 |
| 2013/0308473 A1* | 11/2013 | Sun | H04W 36/30 370/252 |
| 2015/0172988 A1* | 6/2015 | Lai | H04W 36/08 455/436 |
| 2016/0020893 A1* | 1/2016 | Tong | H04W 72/0446 370/280 |
| 2016/0241434 A1* | 8/2016 | Li | H04B 7/2656 |
| 2018/0124675 A1* | 5/2018 | Kusano | H04W 36/32 |
| 2018/0343578 A1* | 11/2018 | Yeoh | H04W 36/0085 |
| 2019/0297543 A1* | 9/2019 | Guo | H04W 36/00 |

* cited by examiner

METHODS AND DEVICES FOR CONTROLLING HANDOVER PROCEDURES IN A WIRELESS COMMUNICATION NETWORK

TECHNICAL FIELD

The proposed technology generally relates to methods and devices for controlling handover procedures in a wireless communication network. More specifically it relates to methods, devices and computer programs for controlling a measurement procedure for uplink measurements between a User Equipment and a number of candidate access network nodes and to methods and devices for selecting a target access network node for a User Equipment during handover from a source access network node.

BACKGROUND

Handover is a vital part of any mobile communication system. A handover is the process of transferring an ongoing connection of a User Equipment, UE, from one cell, i.e. the serving cell, to another cell, i.e. the target cell, in order to accomplish a transparent service over a larger area. The handover should happen without any loss of data and with as small interruption as possible.

To enable a handover, it is necessary to find a suitable target cell and to ensure that it is possible to sustain reliable communication with that target cell. To make sure that it is possible to sustain reliable communication with the target cell, the connection quality in the target cell needs to be estimated before the handover can take place.

The quality in the target cell is estimated by measurements related to the UE. Both downlink and uplink measurements can be considered. In legacy systems, handover based on downlink measurements has been the most common solution; a natural solution as all base stations continuously transmit pilot signals that UEs in neighbor cells can use to estimate the target cell quality. This is true in GSM, BCCH, WCDMA, CPICH and LTE, CRS as well as in WiFi, beacon. This makes it possible to estimate the quality of neighbor cells with relatively good accuracy.

Modern cellular networks will use advanced antenna systems to a large extent. With such antennas, signals will be transmitted in narrow beams to increase the signal strength in some directions and/or to reduce interference in other directions. Continuously transmitting pilot signals in all these beams is then less attractive, since it will generate a lot of interference and also increase the base station energy consumption. During a handover, maintenance of good Signal to Noise Ratio, SNR, and high bit rates require that a UE is handed over from one beam to another. In addition, in the high frequencies considered for 5G systems the radio propagation properties, e.g. low diffraction and poor penetration, the suitability of a certain beam may be quite sensitive to rather small movements and even rotations of the UE. Hence, which beam to hand over a UE to may not be easily determined and to support handover between beams, the UE has to perform a beam finding procedure. During such a beam finding procedure the radio access network nodes that are potential target network nodes for the handover, i.e. candidate access network nodes, transmit Downlink beams, DL beams, e.g. identified by downlink signals, e.g. synchronization and/or reference signals, for the UE to measure on. The beams are typically sequentially transmitted in a manner usually referred to as a beam sweep. The beam sweep may be continuously repeated or activated on demand. The UE searches for the signals transmitted in the beams in the beam sweep and measures their respective quality. The beam with the best measured quality is typically selected as the target for the handover. As mentioned above, system based on narrow beams is sensitive to small movements and rotations of the UE and hence the radio link quality may deteriorate fast, even to the point where the link is lost. This increases the need for a fast handover procedure in beam based system, which is challenging when the handover procedure includes a beam finding procedure involving several beams. Furthermore, with a large number of beams, the above beam-sweeping procedure becomes complicated, which motivates the introduction of alternative solutions.

In a system with advanced antennas, it therefore becomes attractive to rely on uplink measurements, UL measurements. Cellular systems may rely on uplink measurements already today: the UE transmits some uplink signal and several network nodes measure on that signal. The uplink signal may e.g., be a sounding signal, a reference signal or a combined synchronization and reference signal.

One reason that makes the UL measurement based handover an attractive alternative in systems with advanced antennas, i.e. antennas that are capable of and, in high frequencies, relying heavily on advanced beamforming, is the difference in the UL and DL link budget. Since the access network node typically has more antennas and more advanced antenna configurations and receiver than the UE, the receiver gain in the access network node is higher than in the UE, making the link budget more favorable in the uplink. For this reason, beamforming of the transmission of the uplink signal used for UL measurement based handover is not as crucial as for DL measurement based handover, using DL beam sweeps as described above. Typically, a single omnidirectional uplink signal transmission, or possibly a beam sweep consisting of a few wide UL beams, suffices to reach and provide a measurement opportunity for all the candidate access network nodes, since the beamforming gain is provided by the AN. This is clearly more resource efficient than transmitting multiple DL signals in different beam directions from different candidate access network nodes. Furthermore, an additional benefit of UL measurement based handover compared to DL measurement based ditto is that the base station/access network node receiving the uplink signal from the UE may estimate the DL quality based on UL/DL reciprocity especially in TDD deployments which are expected to prevail in high frequency 5G systems. In addition to the downlink quality, also, the DL beam direction to use can be estimated.

The UL measurement based handover starts by initiating the UE uplink signal transmission, so that the candidate cells/access network nodes can measure on it. The measurements of the quality of the UL signal transmitted from all UEs are collected and compared, the network compares all the collected measurements and decides on a suitable target cell/access network node and the decision is communicated to the UE.

UL measurement based HO requires that all candidate access network nodes, candidate ANs, are prepared to listen when the UE transmits its UL signal, e.g. USS.

However, a source AN cannot freely allocate any time and frequency resource for the UE to transmit an UL signal which the candidate AN are supposed to listen for. An arbitrary time/frequency resource may be occupied/reserved for other tasks in a candidate AN, such as reception of UL data from an already connected UE, reception of an UL signal from another UE for which handover is considered, transmission of statically repeated signals, e.g. reference signals, synchronization signals or system information, or transmission of a downlink signal when the system operates in Time Division Duplex Downlink transmit mode, TDD DL TX mode. Brute force enforcement of the UL slot selected by the source node may therefore compromise other important functions in the candidate nodes.

Thus, a mechanism enabling fast allocation of UL transmission resources in UL measurement based handover with limited or no conflicts in the UL signal reception is needed. More specifically, mechanisms are needed that allow for an efficient handling of a handover procedure based on UL measurement procedures.

The present technology aims to provide such mechanisms.

SUMMARY

It is an object to provide mechanisms that enables an efficient handling of a handover procedure whereby a UE served by a source access network node is transferred to the service of a target access network node. It is a more specific object to provide mechanisms that enables such an efficient handling of a handover procedure while at the same time providing for a better use of the transmit- and receive resources that are used by the UE and access network nodes that are candidates to be selected as target access network nodes.

It is a specific object to provide mechanisms for handling a measurement procedure on the uplinks between a UE and candidate access network nodes.

It is another specific object to provide a method, and a corresponding source access network node, for controlling a measurement procedure on the uplinks between a UE and candidate target access network nodes.

It is still another specific object to provide a method, and a corresponding UE, that enables a measurement procedure to be controlled.

It is a further object to provide a method, and a corresponding candidate access network node, that enables a measurement procedure to be controlled.

Yet another object is to provide a computer program for controlling a measurement procedure on the uplinks between a UE and candidate target access network nodes.

Still another object is to provide a method, and a corresponding source access network node, for selecting a target access network node based on performed measurements.

These and other objects are met by embodiments of the proposed technology.

According to a first aspect, there is provided a method performed by a source access network node in a wireless communication network for controlling an uplink measurement procedure for signals transmitted from a User Equipment, UE, to at least one candidate access network node. The method comprises the step of providing a representation of a first uplink resource to the UE and the at least one candidate access network node, the first uplink resource to be used for transmission of a signal by the UE for the at least one candidate access network node to perform measurements on. The method also comprises the step of providing, based on an indication that no measurement was performed by a specific candidate access network node on a signal transmitted using the uplink resource, a representation of a second uplink resource to the UE and to the specific candidate access network node.

According to a second aspect there is provided a method performed by a source access network node for selecting, from a set of candidate access network nodes a target access network node for a User Equipment during handover. The method comprises controlling an uplink measurement procedure according to aspect one, to ensure that at least a subset of the candidate access network nodes are able to perform measurements on an uplink resource. The method also comprises collecting measurement reports from the subset of candidate access network nodes. The method further comprises selecting, based at least partially on the measurement reports, a target access network node for the UE to establish a radio link with during handover.

According to a third aspect there is provided a method for operating a candidate access network node in a wireless communication network. The method comprises obtaining, from an access network node, a representation of a first uplink resource, the uplink resource to be used by a User Equipment, UE, for the transmission of a signal for the candidate access network node to perform measurements on. The method also comprises transmitting a message to the access network node specifying whether the measurement on the uplink resource was performed to enable the access network node to provide a representation of a second uplink resource based on the message.

According to a fourth aspect there is provided a method for operating a User Equipment, UE in a wireless communication network. The method comprises receiving, from an access network node serving the UE, a representation of an uplink resource. The method also comprises transmitting, using the uplink resource, a signal for a candidate access network node to perform measurements on.

According to a fifth aspect there is provided a source access network node. The source access network node is configured to control an uplink measurement procedure for signals transmitted from a User Equipment, UE, to at least one candidate access network node. The source access network node is configured to provide a representation of first uplink resource to the UE and the at least one candidate access network node, the first uplink resource to be used for transmission of a signal by the UE for the at least one candidate access network node to perform measurements on. The source access network node is also configured to provide, based on an indication that no measurement was performed by a specific candidate access network node on a signal transmitted using the uplink resource, a representation of a second uplink resource to the UE and to the specific candidate access network node.

According to a sixth aspect there is provided a candidate access network node. The candidate access network node is configured to obtain, from an access network node, a representation of a first uplink resource, the uplink resource to be used by a User Equipment, UE, for the transmission of a signal for the candidate access network node to perform measurements on. The candidate access network node is also configured to transmit a message to the access network node specifying whether the measurement on the uplink resource was performed to enable the access network node to provide a representation of a second uplink resource based on the message.

According to a seventh aspect there is provided a User Equipment, UE. The UE is configured to receive, from an access network node serving the UE, a representation of an uplink resource. The UE is also configured to transmit, using the uplink resource, a signal for a candidate access network node to perform measurements on.

According to an eighth aspect there is provided a computer program comprising instructions, which when executed by at least one processor, cause the at least one processor to:
   output a representation of a first uplink resource to be provided to a UE and at least one candidate access network node; and
   read an indication specifying whether a measurement was performed by a specific candidate access network node on a signal transmitted using the uplink resource; and
   output, based on the indication, a representation of a second uplink resource to be provided to the UE and to the specific candidate access network node.

According to a ninth aspect there is provided a computer program that comprises instructions, which when executed by at least one processor, cause the processors to:
   read a representation of a first uplink resource, the uplink resource to be used by a User Equipment, UE, for the transmission of a signal for a candidate access network node to perform measurements on; and
   output a message to be transmitted to a source access network node specifying whether the measurement on the uplink resource was performed to enable the source access network node to provide a representation of a second uplink resource based on the message.

According to an tenth aspect there is provided a computer program that comprises instructions, which when executed by at least one processor, cause the at least one processor to:
   read a representation of an uplink resource; and
   control the transmission of a signal using the uplink resource, the signal to be transmitted for a candidate access network node to perform measurements on.

According to a eleventh aspect there is provided a a carrier comprising the computer programs of the ninth, tenth and eleventh aspect, wherein the carrier is one of an electronic signal, an optical signal, an electromagnetic signal, a magnetic signal, an electric signal, a radio signal, a microwave signal, or a computer-readable storage medium.

According to a twelfth aspect there is provided a an apparatus for controlling an uplink measurement procedure for signals transmitted from a User Equipment, UE, to at least one candidate access network node. The apparatus comprises:
   an output module for outputting a first representation of an uplink resource to be provided to a UE and at least one candidate access network node;
   a reading module for reading an indication specifying whether a measurement was performed by a specific candidate access network node on a signal transmitted using the uplink resource; and
   an output module for outputting, based on the indication, a second representation of an uplink resource to be provided to a UE and at least one candidate access network node.

According to a thirteenth aspect there is provided an apparatus for controlling the operation a User Equipment. The apparatus comprises:
   a reading module for reading a representation of an uplink resource; and
   a controlling module for controlling the transmission of a signal using the uplink resource, the signal to be transmitted for a candidate access network node to perform measurements on.

According to a fourteenth aspect there is provided an apparatus for controlling the operation of a candidate access network node, wherein the apparatus comprises:
   a reading module for reading a representation of a first uplink resource, the uplink resource to be used by a User Equipment, UE, for the transmission of a signal for a candidate access network node to perform measurements on; and
   an output module for outputting a message to be transmitted to a source access network node specifying whether the measurement on the uplink resource was performed to enable the source access network node to provide a representation of a second uplink resource based on the message.

Embodiments of the proposed technology enables an efficient handover procedure that is based on uplink measurements whereby a specific candidate access network node can be selected to act as a target network node based on the quality of the uplink between the specific access network node and the User Equipment subject to the handover. This is achieved while at the same time reducing the amount of resources needed for transmission and reception of an uplink signal. Certain embodiments also provides the beneficial feature that a negotiation of the used resources may be performed. Such a negotiation enables an economical use of e.g. energy used by the UE when transmitting uplink signals and also reduces the risks that a particular candidate access network node is occupied with other activities when the UE transmits its uplink signal.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

Figure 1:
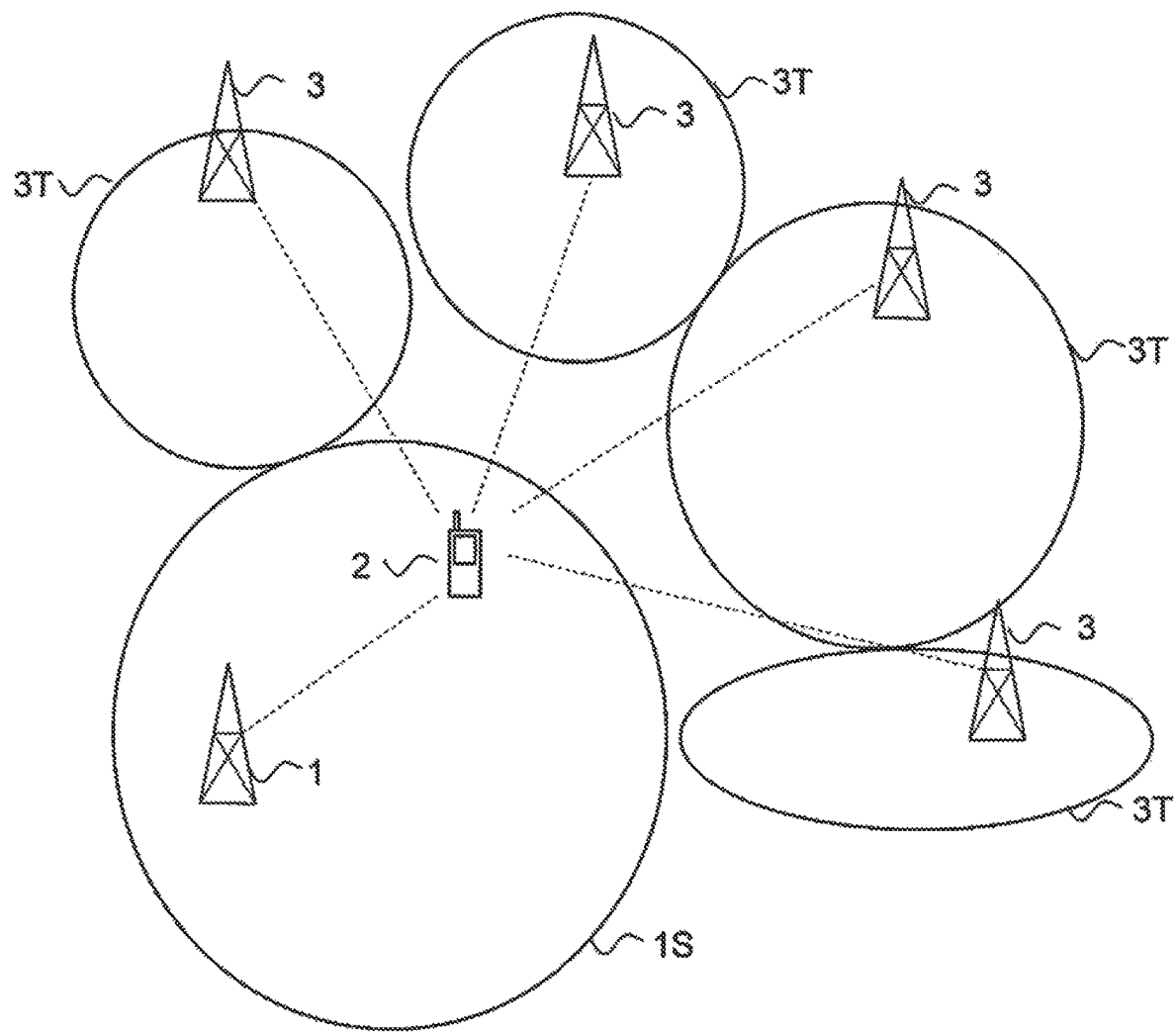
FIG. 1 is a schematic illustration of a cellular communication network comprising a source access network node, a User Equipment and a number of candidate access network nodes.

For a better understanding of the proposed technology, it may be useful to begin with a brief system overview and an analysis of the technical problem. Reference is made to FIG. 1 which illustrates a source access network node 1, also referred to as a source access node or even source node in what follows, serving a User Equipment 2, UE 2, in a first cell 1S, i.e. the source cell. A number of candidate access network nodes 3, also referred to as candidate network nodes or even candidate nodes in what follows, is also shown. Each of the candidate access network nodes may be serving a specific cell 3T but they may also be sharing a common cell, i.e. two or more candidate access network nodes may provide service in a common cell. The radio links between the UE 2 and the various access network nodes are represented schematically by dashed lines.

A common scenario in a cellular network is that, as a UE that is initially served by source access network node 1 in cell 1S approaches the boundary of the cell, it may as a consequence experience deteriorating signal strength on the downlink. This will negatively affect the UEs ability to receive signals from the serving node. A reasonable assumption is that an indication of a poor downlink also indicates a poor uplink, i.e. there is a reciprocity between the quality on the up- and downlink. The access network node may therefore also experience problems to receive and decode transmit signals by the UE in the uplink. To counter these problems, the serving access network node, i.e. the source access network node, may order a handover whereby the service to the UE is transferred to another access network node, i.e. a target access network node. The target access network node replaces the source access network node as the node serving the UE. To be able to provide as smooth a transition as possible between the different access network node s, i.e. the source and target access network nodes, a timely handover should be initiated. To enable a timely transition, continuous measurements of the quality on the up- or downlink connecting the source node and the UE are performed. When the quality on, e.g., the uplink fulfil some specified criterion, e.g. falls below some threshold, a handover procedure may be triggered whereby a suitable target network node should be selected to act as the new serving access network node for the UE. The particular steps to be performed during a handover may in broad terms be identified as: i) determining a suitable time for the handover and, ii) selecting a suitable target access network node. The proposed technology predominantly deals with the latter problem.

A particular issue to take into consideration when a particular target access network node is selected as the new serving access network node for the UE is the provision of the best possible target access network node, i.e. the target access network node that can provide the best, or at least of high enough quality to enable smooth signalling, radio link on either the uplink or the downlink, or preferably in a bidirectional fashion. The target access network node is generally selected from a set of candidate access network nodes. In order to select the best, or at least a suitable, target access network node, the network node that determines which particular access network node, from the set of candidate access network nodes, to select as the new target access network node needs to be provided with information relating to the signal quality on the radio links between the UE and the candidate access network nodes. To this end, measurement has to be performed to extract the information. Measurements may be performed on either the downlink or the uplink. However, as was mentioned earlier, uplink measurements may sometimes be preferable, such as in a system with advanced antennas. Cellular systems utilize uplink measurements already today. In such procedures a UE transmits some uplink signal and several network nodes, i.e. candidate target access network nodes perform measurements on the transmitted signal. The uplink signal may, e.g., be a sounding signal, a reference signal or a combined synchronization and reference signal.

As was mentioned, a particular reason that makes the use of UL measurement based handover more attractive in systems with advanced antennas, i.e. antennas that are capable of and, in high frequencies, relying heavily on advanced beamforming, is the difference in the UL and DL link budget. Since the access network nodes typically has more antennas and more advanced antenna configurations and receiver configurations compared to the UE, the receiver gain in the access network node is higher than the corresponding gain in the UE, making the link budget more favorable in the uplink.

The use of uplink measurements however comes with its own drawbacks, since it requires that all candidate access network nodes 3 are prepared to listen when the UE 2 transmits its UL signal, e.g. transmits a USS, Uplink Synchronization Signal. A source access network node 1 cannot however freely allocate a random time and frequency resource for the UE 2 to use when transmitting an UL signal for the candidate access network node 3 to listen for. An arbitrary time/frequency resource may in particular be occupied/reserved for other tasks in a candidate access network node, such as reception of UL data from an already connected UE, reception of an UL signal from another UE for which handover is considered, transmission of statically repeated signals, e.g. reference signals, synchronization signals or system information, or reception of downlink signals when the system operates in TDD DL TX mode. Brute force enforcement of the UL slot selected by the source node may therefore compromise other important functions in the candidate nodes.

Hence to be able to utilize the sometimes preferable uplink measurement based handover there is a need to provide mechanisms that enables a better controlled or managed measurement procedure. Such a measurement procedure should preferably also ensure reduced signalling since excessive signalling delays the handover procedure, which is particularly harmful in systems based on narrow beamforming, consumes unnecessary energy and may also lead to interference.

The proposed technology provides mechanisms for controlling a measurement procedure whereby candidate access network nodes are enabled to perform measurements on an uplink signal transmitted by the UE in a controlled and effective fashion. The proposed technology enables an improved measurement procedure while at the same time ensuring a reduced amount of signalling.

The proposed technology relies on the cooperation between an access network node 1, i.e. the source access network node 1, a UE 2 and the candidate access network nodes 3. Before describing the functionality of each cooperating entity in detail we will begin by describing the overall procedure. To this end reference is made to FIG. 2 and the signalling diagram of FIG. 3.

Figure 2:
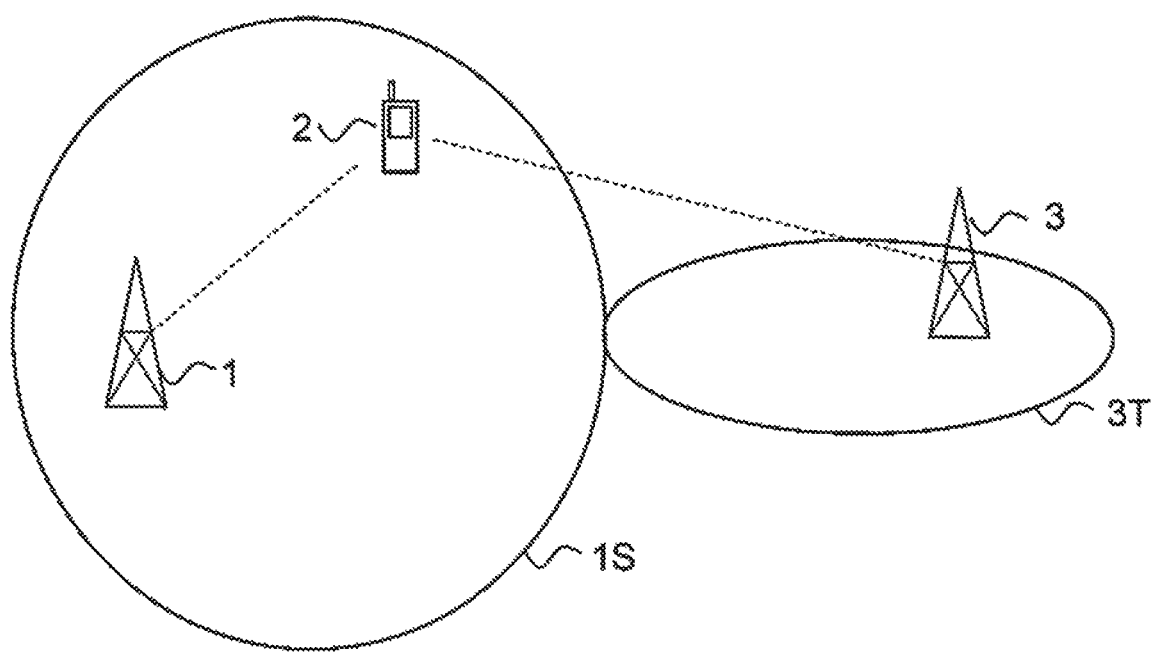
FIG. 2 is a simplified illustration of a cellular communication network comprising a source access network node, a User Equipment and a single candidate access network node.

FIG. 2 provides a schematic illustration of a handover scenario. FIG. 2 discloses in detail a cellular wireless communication network where a source access network node 1 is serving a UE 2 in a first cell 1S. A candidate access network node 3 serving in an adjacent cell 3T is also illustrated. The illustrated network is highly simplified since only a single candidate access network node 3 is illustrated. In general there may be a plurality of candidate access network nodes 3 as well as a plurality of adjacent, or neighbouring, cells.

Figure 3:
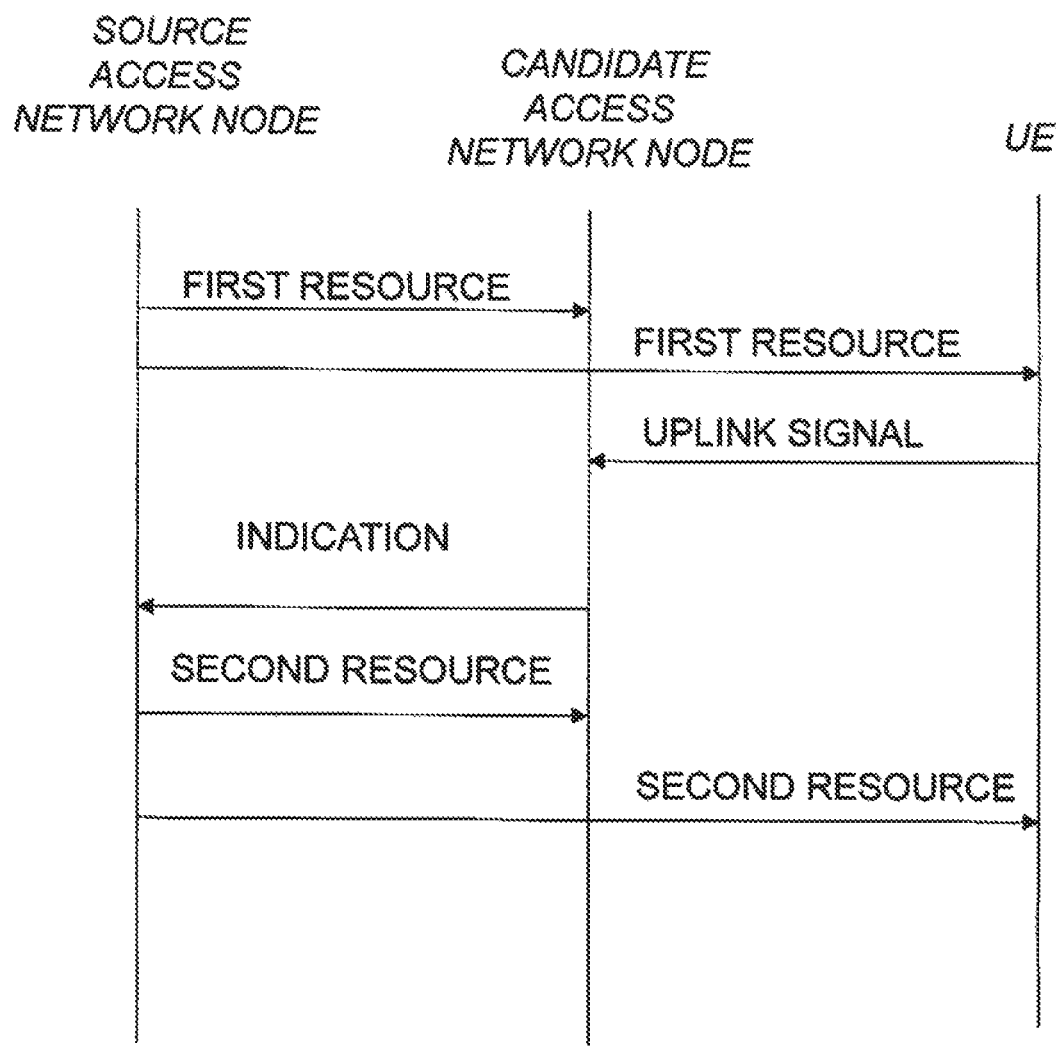
FIG. 3 is a signaling diagram illustrating the signaling between the cooperating devices according to a particular example of the proposed technology.

To facilitate an understanding of the overall procedure a particular but non-limiting example will be used to illustrate how the proposed technology may be used. Reference is made to the signalling diagram in FIG. 3. At first a source access network node 1 will provide an indication of first uplink resource, or a representation of a first uplink resource, denoted first resource in the diagram, to the UE 2 and to the candidate access network node 3. The provided representation of a first uplink resource will be used by the UE 2 to extract a specific uplink resource that will be used for the transmission of an uplink signal. The signal transmitted on the provided uplink resource is intended to be measured on by the candidate access network node 3 in order for the latter to obtain information of the quality on radio uplink between the UE 2 and the candidate access network node. Hence by knowing the uplink resource the candidate access network node may perform a measurement based on the provided uplink resource. Based on the outcome of the measurements performed by the candidate access network node, an indication will be transmitted from the candidate access network node 3 to the source access network node 1. The indication provides, in this particular example, information on the result of the measurement. The information may either be a measurement report, in case the measurement was successfully conducted, or may be an indication that no measurement was performed on the uplink signal. In the latter case, i.e. in the case where no measurement was performed, or could be performed on the provided resource, the source access network node 1 will, as a response, provide a representation of a second uplink resource to the UE 2 and to the specific candidate access network node 3 to enable the UE to transmit a second uplink signal using the second uplink resource. The candidate access network node will try to perform measurements on this second signal and transmit an indication on the outcome. This will be repeated until the source access network node is provided with a measurement report that carries information on the quality of the radio link between the UE 2 and the candidate access network node. It should be noted that in the case where the information in the indication conveys that no measurement can be performed on the provided resource, the indication may be transmitted immediately after receiving the representation of the first uplink resource. That is, before the source access network node 1 sends the representation of the first uplink resource to the UE 2 or after the source access network node 1 sends the representation of the first uplink resource to the UE but before the UE 2 transmits the uplink signal or, as indicated in FIG. 3, after the UE 2 has transmitted the uplink signal. Note also that, although not specifically indicated in FIG. 3, the source access network node 1 itself may also optionally receive and measure on the uplink signal from the UE 2. A particular reason for the source access network node 1 to measure on the uplink signal may be to make sure that it can make a fair comparison between the measurement results reported from the candidate access network nodes 3 and the source access network node's own radio link quality measurements. The embodiment where the source access network node 1 performs measurement on the uplink signal transmitted by the UE 2, utilizing the received representation of the first uplink resource, has the benefit that the source access network node 1 may compare its radio link quality measurements with the measurement results reported from candidate access network nodes 3 instead of basing its own radio link quality assessment on measurements on other UL transmissions from the UE, which may be beamformed towards the source access network node and possibly with a high-gain narrow beam.

Figure 4:
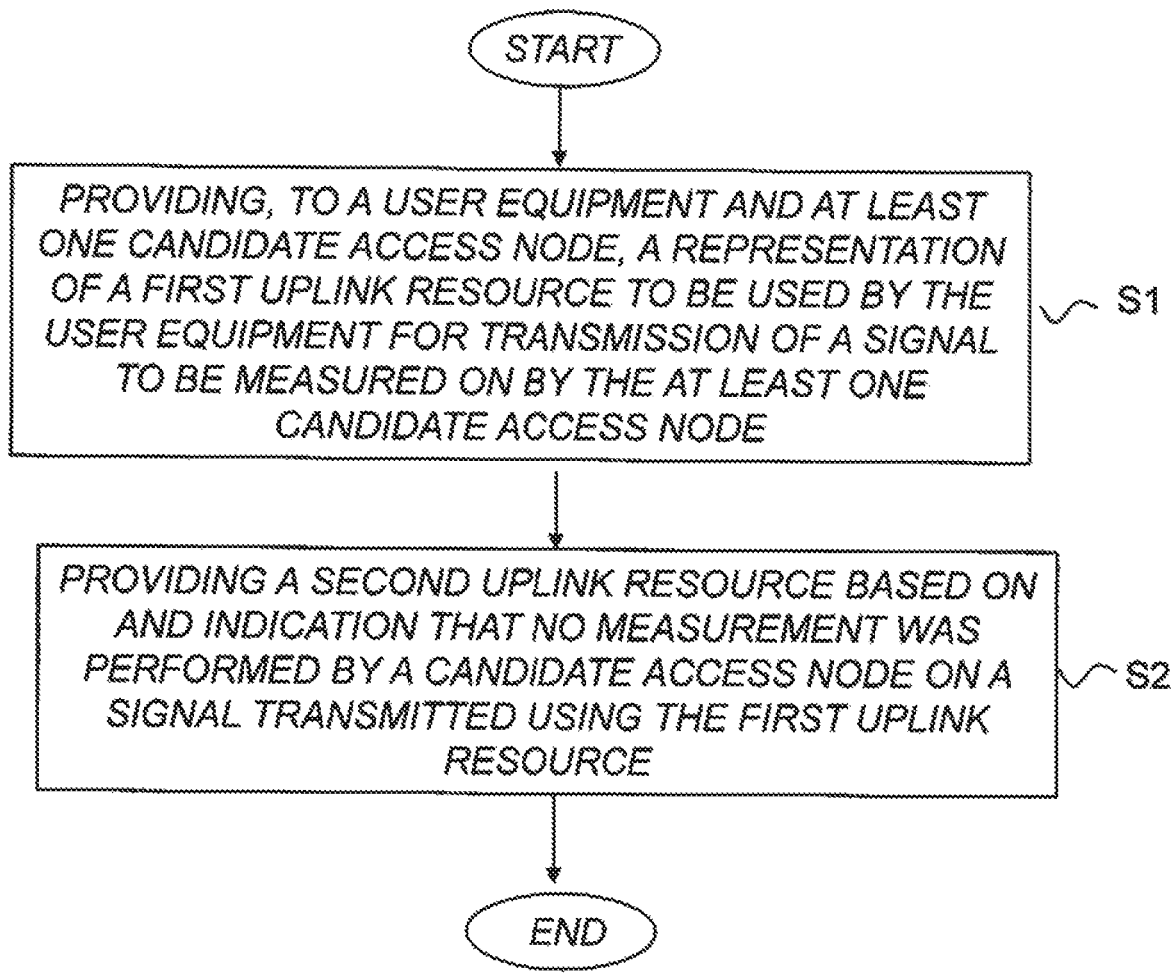
FIG. 4 is a flow diagram illustrating a method for controlling an uplink measurement procedure according to the proposed technology.

FIG. 4 is a schematic flow diagram illustrating a method for controlling an uplink measurement procedure according to the proposed technology. The flow diagram illustrates a method performed by a source access network node 1 in a wireless communication network for controlling an uplink measurement procedure for signals transmitted from a User Equipment 2, UE 2, to at least one candidate access network node 3. The method comprises the step S1 of providing a representation of a first uplink resource to the UE 2 and the at least one candidate access network node 3, the first uplink resource to be used for transmission of a signal by the UE 2 for the at least one candidate access network node 3 to perform measurements on. The method also comprises the step S2 of providing, based on an indication that no measurement was performed by a specific candidate access network node 3 on a signal transmitted using the uplink resource, a representation of a second uplink resource to the UE 2 and to the specific candidate access network node 3.

Stated with slightly different words, there is provided a method performed by an access network node 1, or a source access network node 1, for controlling a measurement procedure where signal characteristics on the uplink, i.e. the radio link from a UE to an access network node. To control the uplink measurement procedure, the access network node 1 provides a UE and at least one candidate access network node 3 with a representation of a first uplink resource to be used by the UE for transmitting a signal to be measured on by the candidate access network node(s). The first uplink resource may be provided as an explicit uplink resource, e.g. by providing an indication of a time resource or a time-frequency resource, e.g. providing a specific first resource slot, but it may also be provided in some other representation whereby the UE and the candidate access network node(s) may utilize a mapping to extract the particular uplink resource from the provided representation. The method also comprises the step of providing a second uplink resource to the UE and a candidate access network node 3 if the source access network node 1 obtains an indication that one or several candidate access network node(s) were unable to perform measurements based on the first uplink resource. This may be repeated until all, or at least a number of, candidate access network nodes has provided the source access network node with a measurement report based on the transmitted uplink signal. The different uplink resources described herein relates to time/frequency resources that represent time/frequency resource slots, i.e. resources for reception of UL signal transmissions at the one or more candidate access network nodes. From the information in the provided resource it will be possible for the candidate access network nodes to infer when the signals are received and also at what frequency, in case there is a frequency synchronization error.

According to a particular embodiment of the proposed technology there is provided a method, wherein the indication that no measurement was performed is obtained from a message, provided by the specific candidate access network node 3, specifying that no measurement was performed.

According to a particular embodiment of the proposed technology there is provided a method, wherein the message also comprises a suggestion of at least one uplink resource allocation that is suitable as the second uplink resource allocation for the specific candidate access network node 3 to enable the access network node 1 to provide a representation of a second uplink resource based on the suggestion.

According to a particular embodiment of the proposed technology there is provided a method, wherein the indication that no measurement was performed comprises an indication that no response relating to the measurement of a signal transmitted using the uplink resource was obtained from a specific candidate access network node 3 within a pre-determined time limit.

According to a particular embodiment of the proposed technology there is provided a method, wherein the method is performed until a measurement report relating to the measurement of a signal transmitted using a provided representation of an uplink resource has been received from each candidate access network node 3 of a specified subset of candidate access network nodes 3. By repeating the described steps until a subset, possibly a predetermined subset, e.g. a certain minimum number, of the candidate access network nodes 3 has provided a measurement report the source access network node will ensure that it has a sufficient number of candidate access network nodes to select a target access network node from. This will ensure that the UE is provided with a suitable target access network node with a good radio link.

According to a particular embodiment of the proposed technology there is provided a method, wherein the step S1 of providing a representation of first uplink resource to the UE 2 and the at least one candidate access network node 3, comprises to provide a first uplink resource that has been negotiated between the source access network node 1 and the candidate access network nodes.

The particular embodiment where the first uplink resource has been negotiated between the source access network node and the candidate access network node enables a highly efficient way of controlling a measurement procedure. It may in particular provide for a quick and smooth handover since the UE will be able to transmit a signal according to uplink resources where it is highly probable that candidate access network nodes will be able to conduct successful measurement on the first attempt. The earlier described method for controlling an uplink measurement procedure for signals transmitted from a User Equipment 2, UE 2, to at least one candidate access network node 3 may therefore be performed based on a first uplink resource that has been negotiated between the source access network node 1 and the candidate access network nodes beforehand, and may even be supplemented with a step S0 of negotiating a first uplink resource with the at least one candidate access network node 3 before the step S1 of providing a representation of a first uplink resource to the UE 2 and the at least one candidate access network node 3 is performed. That is, the first uplink resource provided to the UE 2 and the candidate access network node(s) is a negotiated uplink resource. The step S0 is however not essential when performing the described method, suitable resources may have been negotiated between the source access network node and the at least one candidate access network nodes well in advance of the measurement procedure, e.g. by excluding certain resources based resource allocations pertaining to periodic signaling from the at least one candidate access network nodes.

Below we will describe various examples of how the negotiation resulting in suitable first uplink resources may be performed.

The main purpose of the negotiation is to arrive at a highly reduced set of transmission/receiving resources, TX/RX resources, TX resources from the UE's perspective and RX resources from the candidate access' nodes perspective, that enable a reduction in the number of UL signal transmissions, while at the same time allowing the candidate access network node, candidate AN, to monitor and potentially receive and measure on at least one UL signal transmission.

The source access network node, source AN, or some other controlling entity, selects a list of time-frequency slots constituting a time-frequency resource window, where the time and frequency domains can be seen as orthogonal axes spanning a time-frequency grid, and sends this to the candidate ANs in an initial or first message. The window represents what is acceptable for the potential handover, e.g. in terms of delay in the case of the time domain.

The candidate ANs identifies resources that are available for uplink transmission, e.g. Uplink Synchronization Signal transmissions, USS transmissions, within the time-frequency window and return this information to the source AN in a response message, i.e. in a second message. An Uplink Synchronization Signal is a signal similar to a random access preamble.

The source AN may identify resources that are available in common for the candidate ANs, and select one or a set of these resources and inform the candidate ANs and the UE about the resources in a message, i.e. by means of a third message. This may for example be done at the time of configuring the UE for the procedure. If no single resource common for all candidate ANs can be found, the source AN may select several different resources, i.e. select an initial set of resources which results in the transmission of several uplink transmissions, e.g. several USS transmissions to enable the coverage of all candidate ANs.

This particular mechanism takes care of the challenging task of ensuring that all candidate ANs can listen for and measure on an UL signal transmission from the UE. This will be achieved with a highly reduced set of allocated resources and thus a reduced number of UL signal transmissions. This provides for a resource efficient procedure.

A particular example of the proposed negotiation may be described by following flow, performed by the source AN, SAN, and candidate ANs, CANs, respectively 1000. Select initial set of resource slots, SAN
1010. Request resource slot availability info, SAN 1020. Determine resource slot availability, CAN
1030. Signal resource slot availability CAN
1040. Determine selected transmission slots SAN
1050. Signal selected transmission slots SAN
1060. Prepare for reception and measurement in the selected transmission slot CAN, SAN
1070. Receive USS according to selected resource slots CAN, SAN The source AN, or some other controlling entity, selects a list of time-frequency slots which may be used for USS transmission 1000, wherein this list of time-frequency slots constitutes a time-frequency resource window, where the time and frequency domains can be seen as orthogonal axes spanning a time-frequency grid, and sends this to the candidate ANs in an initial message, first message, in step 1010. The window represents what is acceptable for the potential handover, e.g. in terms of delay in the case of the time domain.

The candidate ANs identify resources available for USS transmission within the time-frequency window 1020 and return this information to the source AN, in the second message 1030. The candidate ANs should preferably reserve the resources they indicate as available until the negotiation is concluded.

The response from a candidate AN could e.g. have the form of a bitmap, where each bit represents a time-frequency resource slot in the time-frequency window and available resources could be indicated by setting the corresponding bits in the bitmap to 1. In accordance with the description above, the source AN should then determine the smallest set of resource slots, e.g. bits in the bitmap, for which all candidate ANs have at least one resource slot available, e.g. at least one bit set to 1, and inform the candidate ANs and the UE accordingly.

The source AN identifies resource slots that are available in common for the candidate ANs, selects one resource slot or a set of resource slots 1040 and informs the candidate ANs 1050 and the UE, when the UE is configured for the procedure. If no single resource slot common for all candidate ANs can be found, the source AN selects several different resources—resulting in several USS transmissions—to cover all candidate ANs. The UE is instructed to transmit USS in all the configured resources The candidate ANs then configure for UL reception in the informed resource slots 1060 and perform USS reception 1070 accordingly.

If a candidate AN has more than one slot resource available in the determined set, this candidate AN may choose one of them for USS reception and use the other ones for other purposes.

The offered time-frequency window in the negotiation, provided by means of the initial message, can be extended with a third dimension, namely the choice of a USS—sequence, or other UL signal sequences. The USS sequence dimension may be utilized to avoid collisions with other USS transmissions in the same transmission resource slot.

The USS sequence dimension of the now three-dimensional resource window could be represented by a range of USS sequences, e.g. a range of USS indexes or a set of USS sequences. The source AN would thus provide a three-dimensional resource window with the three dimensions being time, frequency and USS sequence for the candidate ANs to indicate available resources in.

It should be noted that the USS sequence dimension can be leveraged only when the competing/colliding scheduled event is another USS transmission. This is because only different USS sequences are mutually orthogonal, whereas USS and other data transmissions are not.

As already described, the UE may sometimes have to perform multiple USS transmissions. In general, multiple USS transmissions may be needed, because:
1. The UE needs multiple transmissions to cover the entire sphere.
2. An UL transmission beam sweep is to be used, e.g. because the beamforming gain is needed to reach the candidate ANs.
3. Multiple repeated omnidirectional USS transmissions are to be used to enable measurement averaging or soft combining.
4. An UL transmission beam sweep is to be used because UL transmission beam selection is to be performed.
5. Each candidate AN, or each candidate AN in a subset or the candidate ANs expects a different USS sequence.
6. There is no resource slot in the resource slot window that is commonly available for all candidate ANs.

Below it is described how the cases 1-4 may be handled.

To account for multiple USS transmissions a compound transmission resource has to be allocated that spans the multiple USS transmissions in the time domain and the frequency domain in case frequency multiplexing of multiple USS transmissions is used and the negotiation concerns this compound resource. Optionally the compound resource may be split into multiple, non-adjacent, partial compound resources.

Each candidate AN listens during the entire compound resource and, depending on the purpose and nature of the multiple USS transmissions i.e. depending on which of the above cases that is the reason for the multiple USS transmissions, the candidate AN performs one of the following actions:

The candidate AN selects the best measurement in case of an UL beam sweep for UL beam selection.

The candidate AN calculates an average of the multiple measurements.

The candidate AN performs soft combining of all the measurements.

If a large enough common compound resource cannot be found, then an option for how to deal with the situation in addition to the above described options is that a candidate AN listens for USS transmissions only during a part of the allocated compound resource. This means that the AN inevitably misses one or more of the USS transmissions, which, in the case of UL transmission beam sweeping, means that the candidate AN may miss the best UL beam, while in the case of averaging or soft combining of several omnidirectional transmissions, the consequence is merely that the measurement may be less accurate.

In the case of an UL beam sweep for UL beam selection, the UE may have to use a different USS for each UL beam to ensure that a candidate AN can identify and refer to the best beam. An alternative may be to use the time of reception to identify the UL beam.

Below it is described how case 5 may be handled.

When each candidate AN expects a different USS sequence e.g. because each candidate AN allocates the USS to be used towards it, the negotiation is turned into the opposite of finding common resources, i.e. finding disjoint non-overlapping resources. Disjoint resources are needed so that the UE does not have to transmit multiple USS sequences simultaneously in the same resource slot.

If a three-dimensional time-frequency-USS sequence resource negotiation space is used, then the USS dimension may be leveraged to achieve a single timeslot for USS transmission at the expense of transmitting multiple USSs to different candidate ANs using frequency multiplexing.

Each candidate AN monitors only the resource slot allocated for transmission of the USS sequence targeting this particular candidate AN. This case may be relevant e.g. if each candidate AN allocates the USS that is to be used towards it from a locally unique set of USS sequences, since then a different USS has to be used towards each candidate AN.

Below it is described how case 6 may be handled.

How to handle case 6 has briefly been described before. That is, different resource slots are allocated for different candidate ANs the smallest possible set of resource slots that allows all candidate ANs to receive USS transmissions. A candidate AN may choose to listen for the USS transmission in only one of the resource slots or in multiple resource slots. In the latter case the candidate AN may perform soft combining of the multiple receptions or averaging of the multiple measurements.

According to another optional embodiment of the proposed technology there is provided a method that further comprises performing measurements on the signal transmitted by the UE 2 using the first uplink resource in order to determine the quality of the radio link between the source access network node 1 and the UE 2.

That is, the source access network node 1 may also optionally receive and measure on the uplink signal from the UE 2. A particular reason for the source access network node 1 to measure on the uplink signal may be to make sure that it can make a fair comparison between the measurement results reported from the candidate access network nodes 3 and the source access network node's own radio link quality measurements. The embodiment where the source access network node 1 performs measurement on the uplink signal transmitted by the UE 2, utilizing the received representation of the first uplink resource, has the benefit that the source access network node 1 may compare its radio link quality measurements with the measurement results reported from candidate access network nodes 3 instead of basing its own radio link quality assessment on measurements on other UL transmissions from the UE, which may be beamformed towards the source access network node and possibly with a high-gain narrow beam.

The earlier described embodiments of the method for controlling an uplink measurement procedure may according to the proposed technology also form part of a mechanism for selecting a target network access network node for a User Equipment, UE, during handover of the UE from a source access network node to a target network node. To this end there is provided a method performed by a source access network node 1 in a wireless communication network for selecting, from a set of candidate access network nodes 3 a target access network node 3a for a User Equipment 2 during handover. The method comprises controlling an uplink measurement procedure according to the described embodiments for controlling an uplink measurement procedure, to ensure that at least a subset of the candidate access network nodes 3 are able to perform measurements on an uplink resource.

Figure 7:
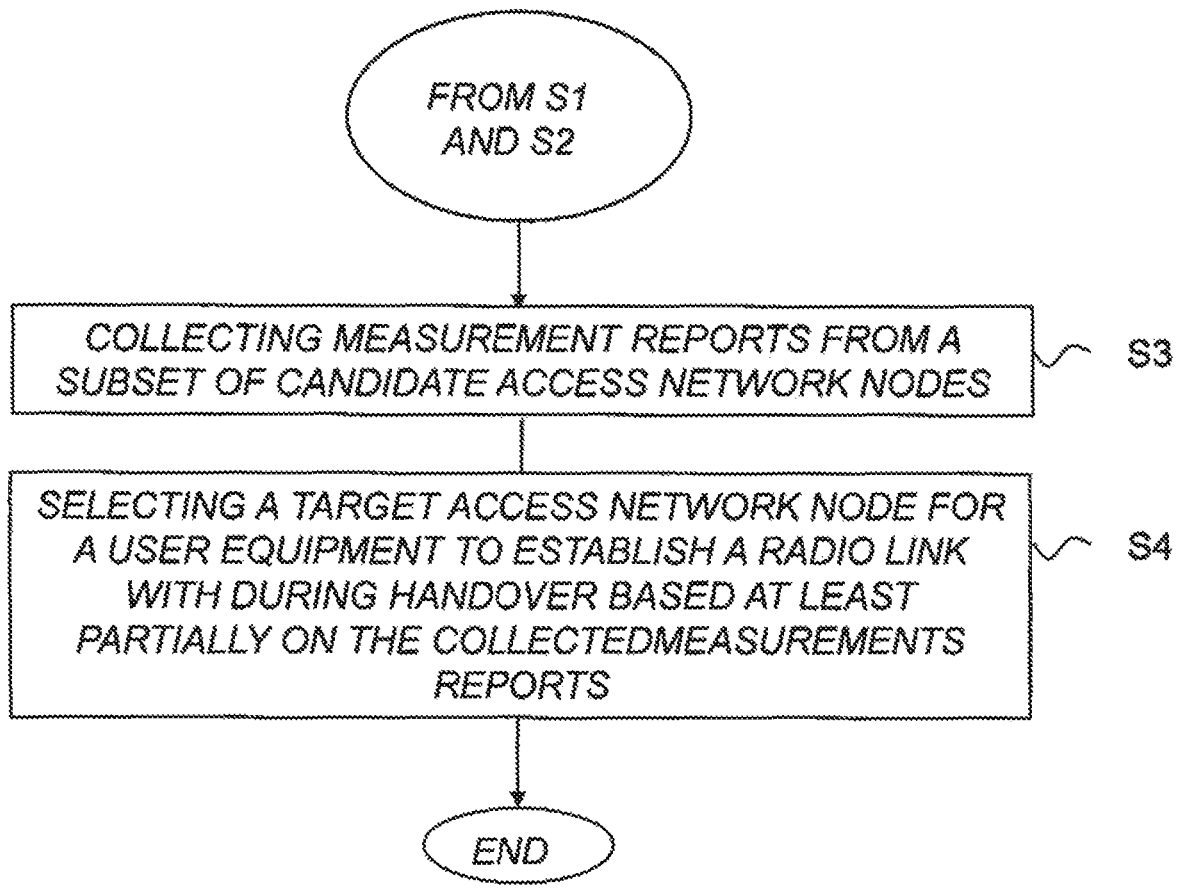
FIG. 7 is a flow diagram illustrating a method for selecting a target access network node according to the proposed technology.

The method also comprises collecting S3 measurement reports from the subset of candidate access network nodes 3. The method further comprises selecting S4, based at least partially on the measurement reports, a target access network node 3a for the UE 2 to establish a radio link with during handover. This method is illustrated in the flow diagram of FIG. 7.

Described with slightly different words, the proposed method for selecting a target access network node utilizes the earlier proposed method for controlling an uplink measurement procedure to ensure that at least a subset of the possible candidate access network nodes 3, i.e. the access network nodes that are candidates to be selected as target network nodes, are able to perform measurements on an uplink resource and report the measurements to the source access network node 1. When the measurement reports have been collected, or received, the method proceeds to select a specific target access network node 3a, from the set of candidate access network nodes 3, for the UE 2 to establish a radio link with during handover. The specific selection procedure may in particular embodiments be based on a comparison of quality criterions, or criteria, relating to the measured quality on the uplink. The method may, for example, select the target access network node 3a where the signal to noise ratio on the uplink from the UE to the target access network node is highest. Other quality measures are however possible.

According to a particular embodiment of the proposed technology there is provided a method wherein the step S4 of selecting a target access network node 3a is further based on measurements of the quality of the radio link between the source access network node 1 and the UE 2. That is, the method also utilizes the measurements performed by the source access network node 1 on the signal transmitted by the UE 2 when selecting a target access network node. This optional embodiment may ensure that the UE is not transferred to a new access network node where the radio link quality is worse compared to the radio link between the UE 2 and the source access network node.

According to a specific embodiment of the proposed technology there is provided a method wherein the step S4 of selecting a target access network node 3a comprises to compare the quality indicated by the collected measurement reports with the quality of the radio link between the source access network node 1 and the UE 2, whereby a particular candidate access network node may be selected as the target access network node 3a if the quality of the radio link between the particular candidate access network node 3 and the UE 2 is better than the quality of the radio link between the source access network node 1 and the UE 2.

Figure 6:
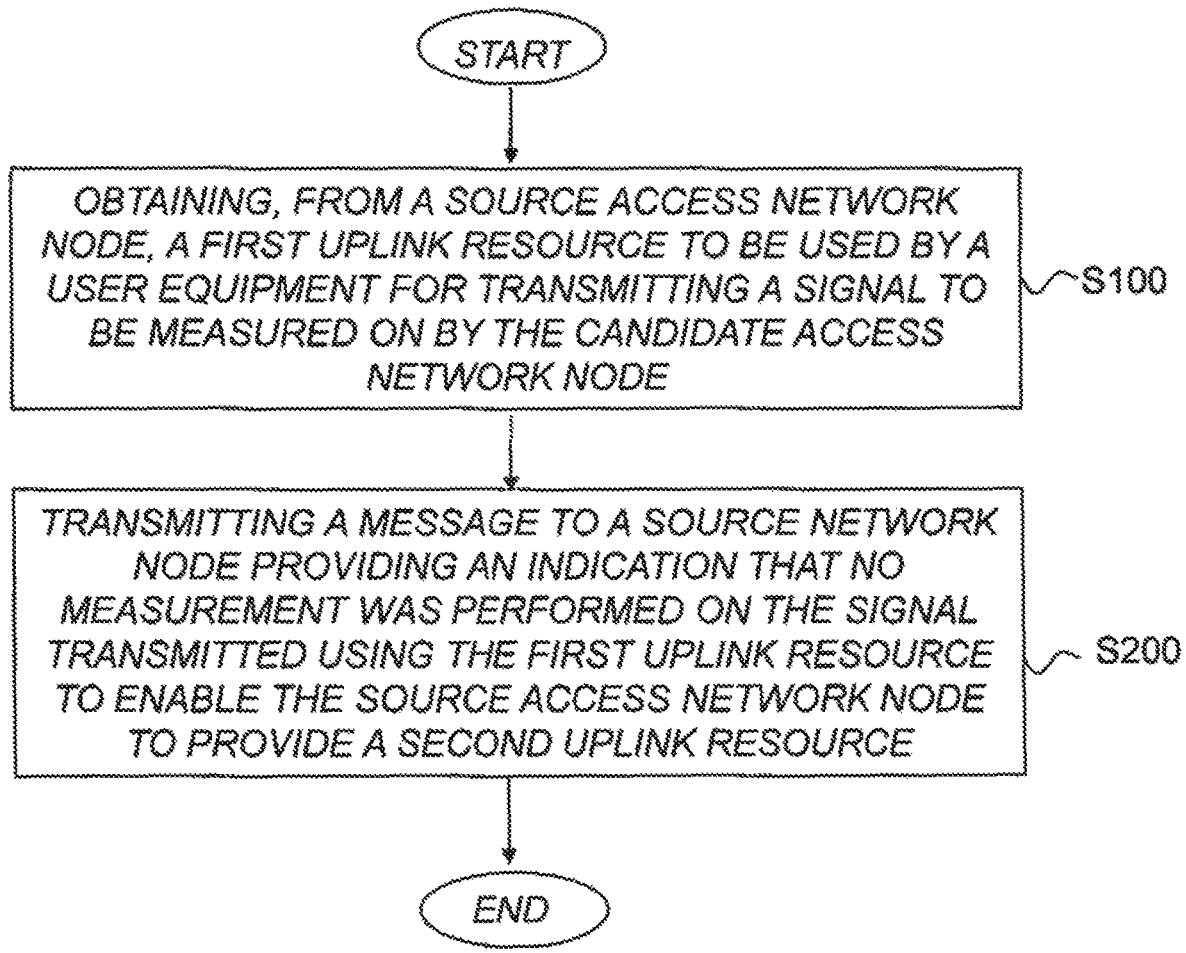
FIG. 6 is a flow diagram illustrating a method for operating a candidate access network node according to the proposed technology.

Having described various embodiment of methods performed by the source access network node 1 in detail, below will follow a detailed description of a complementary method performed by a candidate access network node 3. The complementary or cooperating method is illustrated schematically in FIG. 6. Illustrated is a method for operating a candidate access network node 3 in a wireless communication network. The method comprises obtaining S100, from a source access network node 1, a representation of a first uplink resource, the uplink resource to be used by a User Equipment 2, UE 2, for the transmission of a signal for the candidate access network node 3 to perform measurements on. The method also comprises transmitting S200 a message to the access network node 1 specifying whether the measurement on the uplink resource was performed to enable the access network node 3 to provide a representation of a second uplink resource based on the message.

Described with slightly different words, the proposed technology provides a method for operating a candidate access network node 3. The method cooperates with the earlier described methods for controlling an uplink measurement procedure or selecting a target network node during handover. The method comprises to obtain S100, either via information provided through signaling in an air-interface— e.g. transmitted through radio, or via an inter-access network node interface, e.g. transmitted through optical fibers or alike, information comprising a first uplink resource, or a representation of first uplink resource, from an access network node 1, e.g. the source access network node 1. As was stated earlier, the first uplink resource may be obtained as a direct uplink resource, e.g. by obtaining an indication of a time resource or a time-frequency resource, but it may also be obtained in some other representation whereby the candidate access network node(s) may utilize a mapping to extract the particular uplink resource from the provided representation. The first uplink resource relates to a particular transmission of a signal from a UE, on which signal the candidate access network node should attempt to perform measurements on. Having obtained the representation of the first uplink resource the candidate access network node 3, transmits, to the access network node 1—i.e. the source access network node, in step S100 a message providing an indication whether a measurement was performed. The information carried by the transmitted message is to be used by the access network node 1 as a basis for determining whether a representation of second uplink resource should be provided, i.e. if the method for controlling an uplink measurement procedure performed by the source access network node 1 should be repeated.

According to a particular embodiment of the proposed technology there is provided a method, wherein the message comprises an indication that no measurement was performed and at least one suggestion of a second uplink resource that is suitable for the access network node 3. In other words, this embodiment enables a candidate access network node 3 to inform the access network node 1, i.e. the source access network node 1, that no measurements could be performed on the transmitted signal. The inability to measure may, e.g. be due to bad signal quality. It may however also be due to the fact that the candidate access network node 3 was occupied with other activity in the particular resource. According to such an embodiment of the proposed technology there is thus provided a method, wherein the message is transmitted if the first uplink resource collides with a scheduled activity. The candidate access network node may also supplement the no-measurement information with a suggestion of resources that are suitable for the candidate access network node 3, e.g. resources where the candidate access network node is not occupied with other activity.

Figure 5:
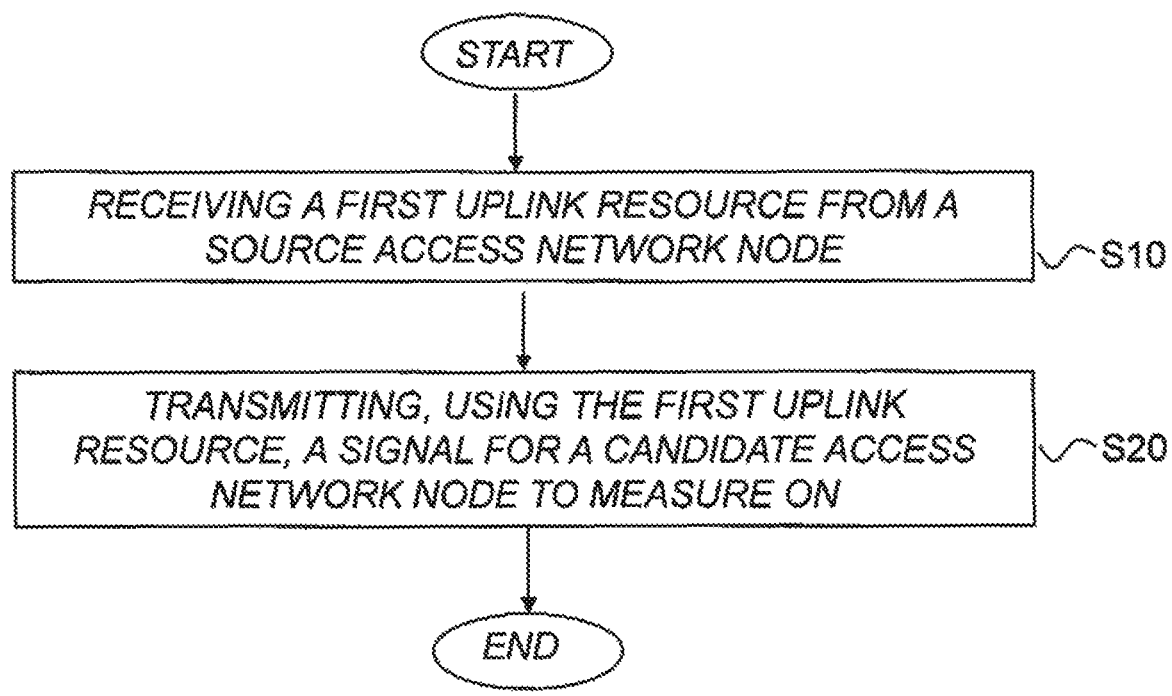
FIG. 5 is a flow diagram illustrating a method for operating a User Equipment according to the proposed technology.

Below we proceed and describe a complementary, or cooperating, method performed by a User Equipment. FIG. 5 provides an illustration of such a method according to the proposed technology. Illustrated is a method for operating a User Equipment 2, UE 2, in a wireless communication network. The method comprises receiving S10, from an access network node 1 serving the UE 2, a representation of an uplink resource. The method also comprises transmitting S20, using the uplink resource, a signal for a candidate access network node 3 to perform measurements on.

Put slightly differently, there is provided a method wherein a UE 2 receives, from an access network node 1 serving the UE 2, i.e. the source access network node 1, a representation of an uplink resource, i.e. a first uplink resource as described earlier. The first uplink resource may be obtained as a direct uplink resource, e.g. by obtaining an indication of a time resource or a time-frequency resource, but it may also be obtained in some other representation whereby the UE may utilize a mapping to extract the particular uplink resource from the provided representation. The UE 2 uses the provided uplink resource to transmit an uplink signal with the intention that a candidate access network node 3, or several candidate access network nodes 3, should perform measurements on the signal to enable the candidate access network node(s) 3 to generate a measurement report relating to the uplink signal and transmit it to the source access network node to enable the latter to determine a suitable target access network node 3a among the candidate access network node(s) 3. The content of the uplink signal transmitted from the UE is not essential, it is enough if the candidate access network node(s) is/are able to perform measurements on the signal, it may however be advantageous if the uplink signal comprised specific information.

According to a particular embodiment of the proposed technology there is provided a method, wherein the signal transmitted using the uplink resource comprises information specifying an identity feature of the UE 2. According to a specific embodiment of the proposed technology there is provided a method wherein the identity feature comprises the identity of the cell in which the UE 2 is served. According to still another specific embodiment of the proposed technology there is provided a method wherein the identity feature further comprises the identity of the UE 2. One of the benefits of including a UE identity already in the uplink signal, is that the subsequent connection setup may be performed quicker.

Still another benefit of including an identity feature is that it allows the source access network node to link the measurement report to the relevant UE. This may be achieved e.g. if the candidate access network node forwards the UE ID—or some information from which the UE ID can be derived—to the source access network node. In case the source access network node has initiated multiple UL measurement procedures in parallel this may be a beneficial feature.

The inclusion of the UE identity, or identity feature, in the signal to the candidate access network nodes could potentially also be useful for the candidate access network nodes in cases where multiple UL measurement procedures utilize the same UL resources for transmitting a signal toward the candidate access network node and the candidate access network node has no other means of telling which UE a signal received in that resource originates from, and consequently would not be able to know which source access network node and/or which signaling procedure instant to report the measurement result to.

To further describe the step S20 of transmitting, using the uplink resource, a signal for a candidate access network node 3 to perform measurements on it should be noted that the UE may transmit the signal in an omnidirectional fashion, preferably with as even power distribution in all directions as possible. There may however be cases where a particular UE implementation does not allow omnidirectional transmission, but only more or less wide UL beams. In such cases, the UL signal transmission may comprise a set of consecutively transmitted UL beams, which together cover all relevant directions, e.g. the entire sphere or a partial sphere excluding some less likely directions, i.e. in essence the UE could perform an UL beam sweep. Hence each single UL signal transmission may be replaced by a set of UL signal transmissions, e.g. forming an UL beam sweep. According to a particular embodiment of the proposed technology there is thus provided a method wherein the step S20 of transmitting, using the uplink resource, a signal for a candidate access network node 3 to perform measurements, comprises to transmit a set of UL signal transmissions forming a beam sweep.

According to still another embodiment there is provided a method wherein the step S20 of transmitting, using the uplink resource, a signal for a candidate access network node 3 to perform measurements, comprises to repeat the single transmission a certain number of times, i.e. periodically based on the first uplink resource, or according to a predetermined transmission pattern that is initiated based on the first uplink resource. This may be beneficial in those particular scenarios where the link budget in the UL is not good enough for a single UL signal transmission to be sufficient.

In such cases, a UE capable of omnidirectional UL transmission might repeat the single transmission a certain number of times, to allow the receiving candidate access network nodes to collect enough energy for a good measurement averaging. It should also be noted that in a case where the UE needs to transmit an UL beam sweep to cover all relevant directions and the UL link budget still requires repeated transmission, the UL beam sweep may be replaced by a beam sweep with a corresponding repetition of each beam, ether successive repetitions of the same beam until the next beam in the sweep is transmitted, or repetition of full single transmission beam sweeps.

Note also that in all cases the described the repetition may be replaced by a narrower beamforming, e.g. from omnidirectional transmission to wide beams or from wide beams to narrow beams. The actual number of transmissions is typically roughly the same, irrespective of whether repetition or the narrowing of beams is used.

Having described the cooperating methods in detail, in what follows there will be provided various examples of devices and computer programs that may be used to perform the various methods. The particular effects and advantages that are associated with the various described entities are the same as those described in relation to the proposed methods and will not be described again.

To this end, as used herein, the non-limiting term "network node", "access network node", "source access network node", "candidate access network node", "target access network node", "source network node", "candidate network node", and "target network node" may refer to base stations, access points, network control nodes such as network controllers, radio network controllers, base station controllers, access controllers, and the like. In particular, the term "base station" may in particular encompass different types of radio base stations including standardized base station functions such as Node Bs, or evolved Node Bs eNBs, and also macro/micro/pico radio base stations, home base stations, also known as femto base stations, relay nodes, repeaters, radio access points, Base Transceiver Stations BTSs, and even radio control nodes controlling one or more Remote Radio Units RRUs, or the like.

A particular aspect of the proposed technology provides a source access network node 1. The source access network node 1 is configured to control an uplink measurement procedure for signals transmitted from a User Equipment 2, UE 2, to at least one candidate access network node 3. The source access network node 1 is configured to provide a representation of first uplink resource to the UE 2 and the at least one candidate access network node 3, the first uplink resource to be used for transmission of a signal by the UE 2 for the at least one candidate access network node 3 to perform measurements on. The source access network node 1 is also configured to provide, based on an indication that no measurement was performed by a specific candidate access network node 3 on a signal transmitted using the uplink resource, a representation of a second uplink resource to the UE 2 and to the specific candidate access network node 3.

According to a particular embodiment of the proposed technology there is provided a source access network node 1, wherein the source access network node 1 is configured to obtain the indication that no measurement was performed obtained from a message, provided by the specific candidate access network node 3, specifying that no measurement was performed.

According to a particular embodiment of the proposed technology there is provided a source access network node 1 wherein the message also comprises a suggestion of at least one uplink resource allocation that are suitable as the second uplink resource allocation for the specific candidate access network node 3 and wherein the source access network node 1 is configured to provide a representation of a second uplink resource based on the suggestion.

According to a particular embodiment of the proposed technology there is provided a source access network node 1 wherein the source access network node 1 is configured to obtain an indication that no measurement was performed by determining that no response relating to the measurement of a signal transmitted using the uplink resource was obtained from a specific candidate access network node 3 within a pre-determined time limit.

According to a particular embodiment of the proposed technology there is provided a source access network node 1 wherein the source access network node 1 is configured to control the uplink measurement procedure until a measurement report relating to the measurement of a signal transmitted using a provided representation of an uplink resource has been received from each candidate access network node 3 of at least a specified subset of candidate access network nodes 3.

According to a particular embodiment of the proposed technology there is provided a source access network node 1 that is configured to provide a representation of first uplink resource to the UE 2 and the at least one candidate access network node 3, where the first uplink resource has been negotiated between the source access network node 1 and the candidate access network nodes.

According to an optional embodiment there is provided a source access network node 1 according wherein the source access network node 1 is configured to perform measurements on the signal transmitted by the UE 2 using the first uplink resource in order to determine the quality of the radio link between the source access network node 1 and the UE 2.

According to still another embodiment of the proposed technology there is provided a source access network node 1, wherein the source access network node 1 is further configured to collect measurement reports from the subset of candidate access network nodes 3, and wherein the source access network node 1 is further configured to select, based at least partially on the measurement reports, a target access network node 3a for the UE 2 to establish a radio link with during handover.

A specific embodiment related to the one described above provides a source access network node 1 that is also configured to select a target access network node 3a based on measurements of the quality of the radio link between the source access network node 1 and the UE 2.

According to yet another embodiment of the proposed technology there is provided a source access network node 1 that is configured to select a target access network node 3a by comparing the quality indicated by the collected measurement reports with the quality of the radio link between the source access network node 1 and the UE 2, whereby a particular candidate access network node may be selected as the target access network node 3a if the quality of the radio link between the particular candidate access network node 3 and the UE 2 is better than the quality of the radio link between the source access network node 1 and the UE 2.

Figure 8:
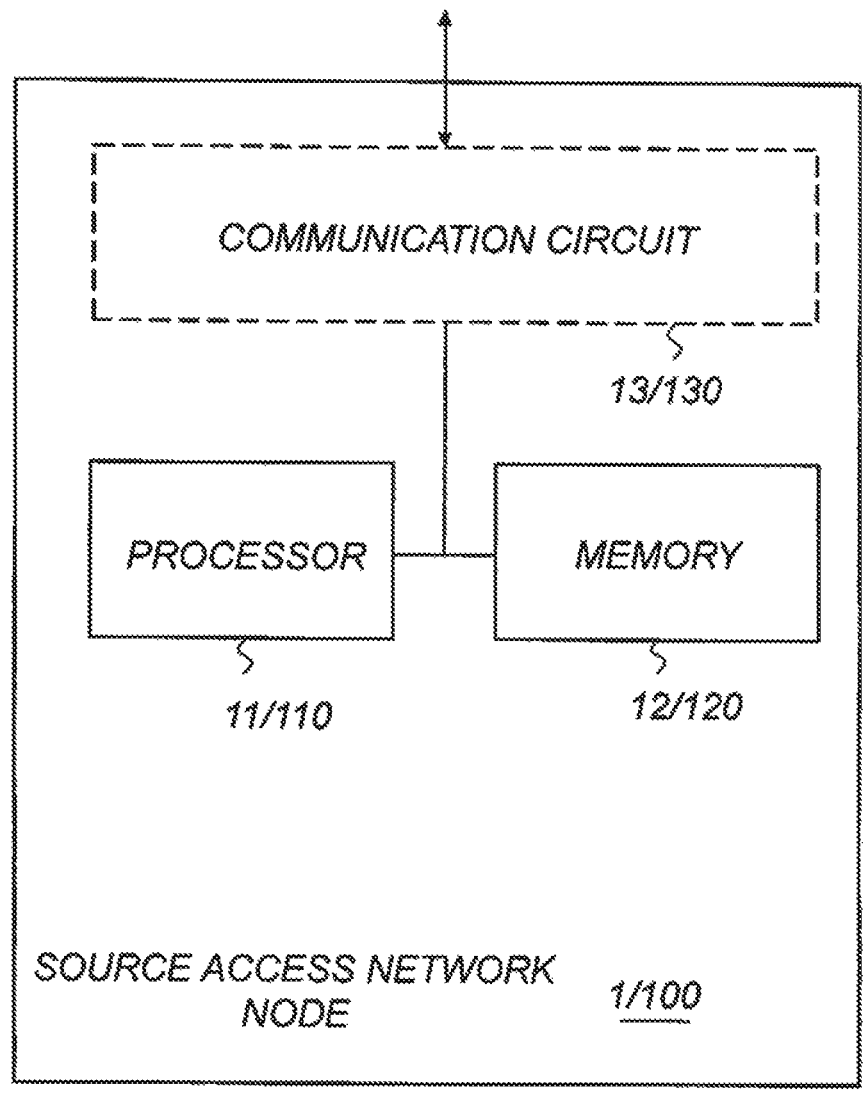
FIG. 8 is a block diagram illustrating a particular embodiment of a source access network node according to the proposed technology.

FIG. 8 is a schematic block diagram illustrating an example of a source access network node 1, based on a processor-memory implementation according to an embodiment. In this particular example, the source access network node 1 comprises a processor 11 and a memory 12, the memory 12 comprising instructions executable by the processor 11, whereby the processor is operative to control an uplink measurement procedure.

Figure 11:
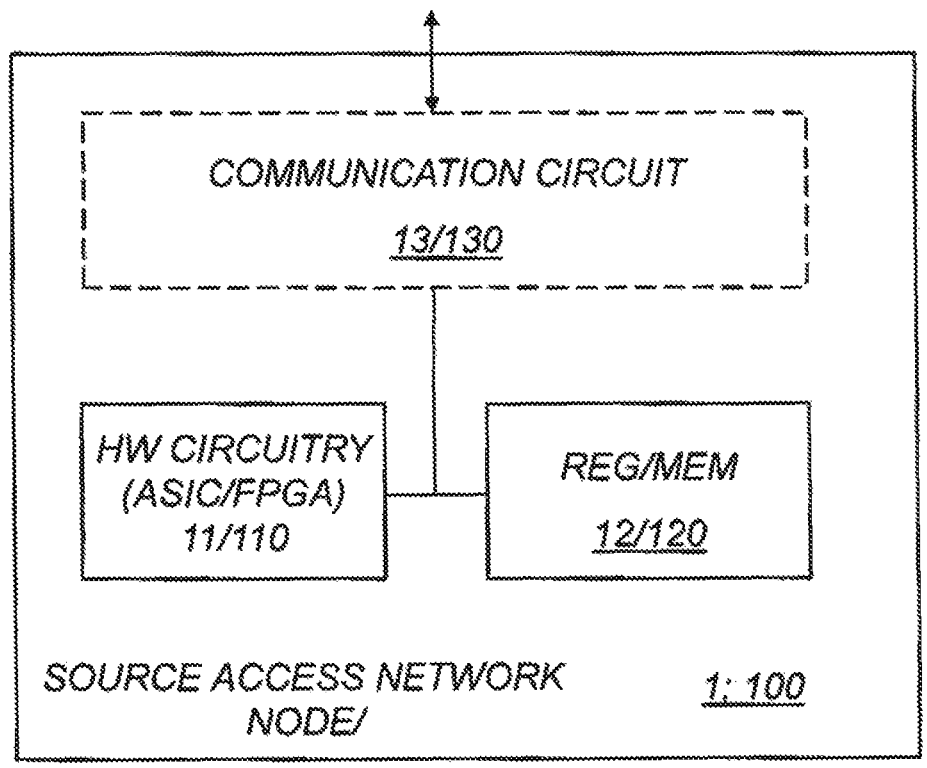
FIG. 11 is a block diagram illustrating an alternative embodiment of a source access network node according to the proposed technology

FIG. 11 is a schematic block diagram illustrating another example of a source access network node 1, based on a hardware circuitry implementation according to an embodiment. Particular examples of suitable hardware circuitry 11 include one or more suitably configured or possibly reconfigurable electronic circuitry, e.g. Application Specific Integrated Circuits ASICs, Field Programmable Gate Arrays FPGAs, or any other hardware logic such as circuits based on discrete logic gates and/or flip-flops interconnected to perform specialized functions in connection with suitable registers REG and/or memory units MEM 12.

The source access network node 1 may also include a communication circuit 13. The communication circuit 13 may include functions for wired and/or wireless communication with other devices and/or network nodes in the network. In a particular example, the communication circuit 13 may be based on radio circuitry for communication with one or more other nodes, including transmitting and/or receiving information. The communication circuit 13 may be interconnected to the processor 11 and/or memory 12. The communication circuit 13 may be interconnected to the hardware circuitry 11 and/or REG/MEM 12. By way of example, the communication circuit 13 may include any of the following: a receiver, a transmitter, a transceiver, input/output I/O circuitry, input ports and/or output ports.

It is also possible to provide a solution based on a combination of hardware and software. The actual hardware-software partitioning can be decided by a system designer based on a number of factors including processing speed, cost of implementation and other requirements.

Figure 14:
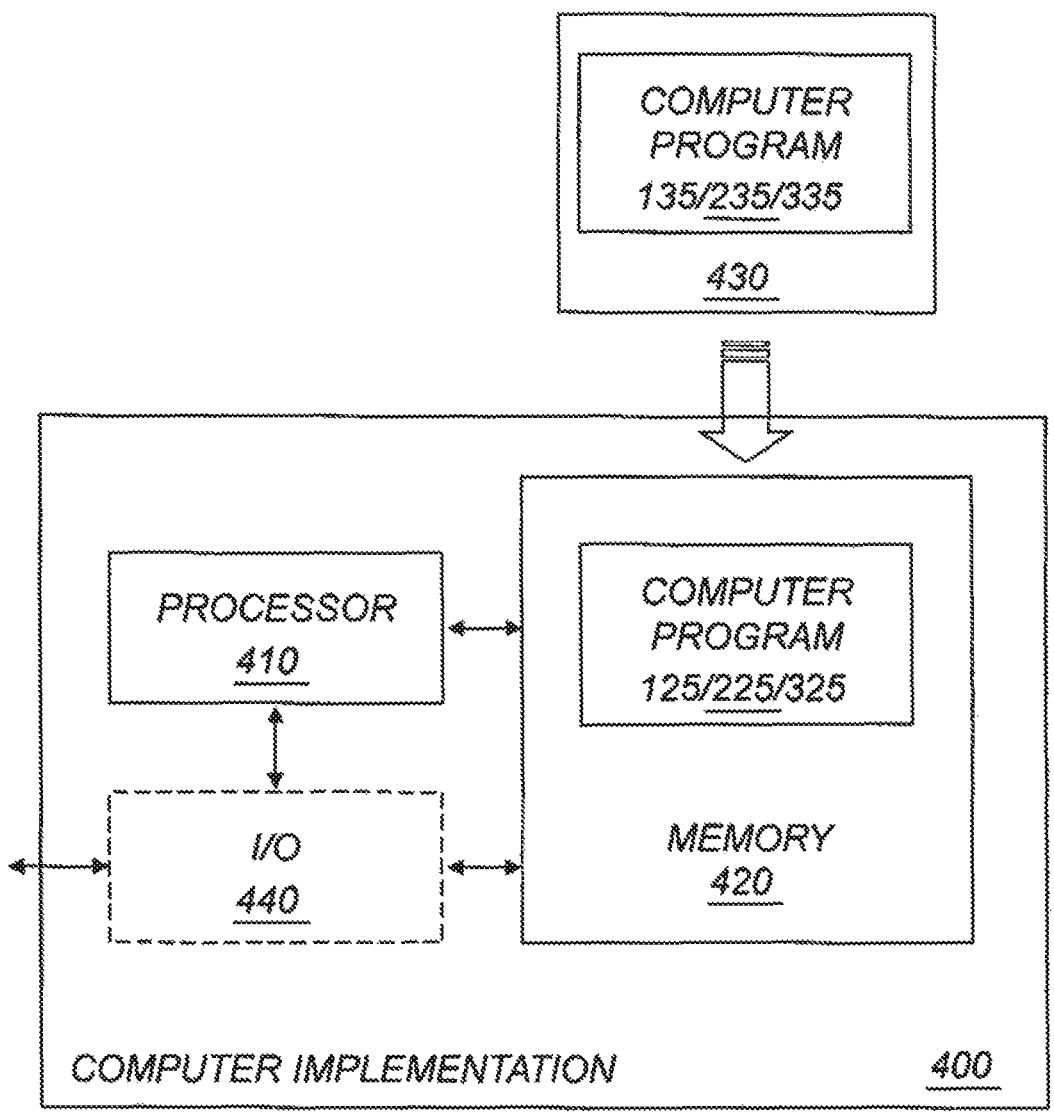
FIG. 14 is a block diagram illustrating a computer program implementation in a network equipment, a User Equipment or a network node according to the proposed technology.

FIG. 14 is a schematic diagram illustrating an example of a computer-implementation 400 according to an embodiment. In this particular example, at least some of the steps, functions, procedures, modules and/or blocks described herein are implemented in a computer program 125; 135, which is loaded into the memory 420 for execution by processing circuitry including one or more processors 410. The processors 410 and memory 420 are interconnected to each other to enable normal software execution. An optional input/output device 440 may also be interconnected to the processors 410 and/or the memory 420 to enable input and/or output of relevant data such as input parameters and/or resulting output parameters.

The term 'processor' should be interpreted in a general sense as any system or device capable of executing program code or computer program instructions to perform a particular processing, determining or computing task.

The processing circuitry including one or more processors 410 is thus configured to perform, when executing the computer program 425, well-defined processing tasks such as those described herein.

The processing circuitry does not have to be dedicated to only execute the above-described steps, functions, procedure and/or blocks, but may also execute other tasks.

In a particular embodiment, the computer program 125 comprises instructions, which when executed by at least one processor 410, cause the at least one processor to:
  output a representation of a first uplink resource to be provided to a UE 2 and at least one candidate access network node 3; and
  read an indication specifying whether a measurement was performed by a specific candidate access network node 3 on a signal transmitted using the uplink resource; and
  output, based on the indication, a representation of a second uplink resource to be provided to the UE 2 and to the specific candidate access network node 3.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

Still another aspect of the proposed technology relates to a source access network node 100 that utilizes any of the embodiments described above in order to select a target access network node 3 for a User Equipment 2. According to this aspect there is provided a source access network node 100 that is configured to select, from a set of candidate access network nodes 3 a target access network node 3a for a User Equipment 2 during handover. The source access network node 100 is configured to control an uplink measurement procedure according to what has been described above, to ensure that at least a subset of the candidate access network nodes 3 are able to perform measurements on an uplink resource. The source access network node 100 is also configured to collect measurement reports from the subset of candidate access network nodes 3. The source access network node 100 is also configured to select, based at least partially on the measurement reports, a target access network node 3a for the UE 2 to establish a radio link with during handover.

This embodiment provides in more detail a source access network node 100 that is configured to select, from a set of candidate access network nodes 3 a target access network node 3a for a User Equipment 2 during handover. The source access network node 100 is configured to control an uplink measurement procedure by being configured to provide a representation of a first uplink resource to a UE 2 and at least one candidate access network node 3, the first uplink resource to be used for transmission of a signal by the UE 2 for the at least one candidate access network node 3 to perform measurements on, and by being configured to provide, based on an indication that no measurement was performed by a specific candidate access network node 3 on a signal transmitted using the uplink resource, a representation of a second uplink resource to the UE 2 and to the specific candidate access network node 3. The source access network node 100 is also configured to collect measurement reports from the subset of candidate access network nodes 3. The source access network node 100 is also configured to select, based at least partially on the measurement reports, a target access network node 3a for the UE 2 to establish a radio link with during handover.

According to an optional embodiment of the source access network node there is provided a source access network node 100 that is also configured to select a target access network node 3a based on measurements of the quality of the radio link between the source access network node 1 and the UE 2.

According to a specific embodiment there is provided a source access network node 100 that is configured to select a target access network node 3a by comparing the quality indicated by the collected measurement reports with the quality of the radio link between the source access network node 1 and the UE 2, whereby a particular candidate access network node may be selected as the target access network node 3a if the quality of the radio link between the particular candidate access network node 3 and the UE 2 is better than the quality of the radio link between the source access network node 1 and the UE 2.

FIG. 8 is a schematic block diagram illustrating an example of a source access network node 100, based on a processor-memory implementation according to an embodiment. In this particular example, the source access network node 100 comprises a processor 110 and a memory 120, the memory 120 comprising instructions executable by the processor 110, whereby the processor is operative to select a target access network node 3 for a User Equipment 2.

FIG. 11 is a schematic block diagram illustrating another example of a source access network node 100, based on a hardware circuitry implementation according to an embodiment. Particular examples of suitable hardware circuitry 110 include one or more suitably configured or possibly reconfigurable electronic circuitry, e.g. Application Specific Integrated Circuits ASICs, Field Programmable Gate Arrays FPGAs, or any other hardware logic such as circuits based on discrete logic gates and/or flip-flops interconnected to perform specialized functions in connection with suitable registers REG and/or memory units MEM 120.

The source access network node 100 may also include a communication circuit 130. The communication circuit 130 may include functions for wired and/or wireless communication with other devices and/or network nodes in the network. In a particular example, the communication circuit 130 may be based on radio circuitry for communication with one or more other nodes, including transmitting and/or receiving information. The communication circuit 130 may be interconnected to the processor 110 and/or memory 120. The communication circuit 130 may be interconnected to the hardware circuitry 110 and/or REG/MEM 120. By way of example, the communication circuit 130 may include any of the following: a receiver, a transmitter, a transceiver, input/output I/O circuitry, input ports and/or output ports.

The proposed technology also provides a candidate access network node 3 in a wireless communication network. The candidate access network node 3 is configured to obtain, from a source access network node 1, a representation of a first uplink resource, the uplink resource to be used by a User Equipment 2, UE 2, for the transmission of a signal for the candidate access network node 3 to perform measurements on. The candidate access network node 3 is also configured to transmit a message to the source access network node 1 specifying whether the measurement on the uplink resource was performed to enable the source access network node 1 to provide a representation of a second uplink resource based on the message.

According to a particular embodiment of the proposed technology there is provided a candidate access network node 3 that is configured to transmit a message that comprises an indication that no measurement was performed and at least one suggestion of a second uplink resource that is suitable for the candidate access network node 3.

According to a particular embodiment of the proposed technology there is provided a candidate access network node 3, wherein the candidate access network node 3 is configured to transmit the message if the first uplink resource collides with a scheduled activity.

Figure 9:
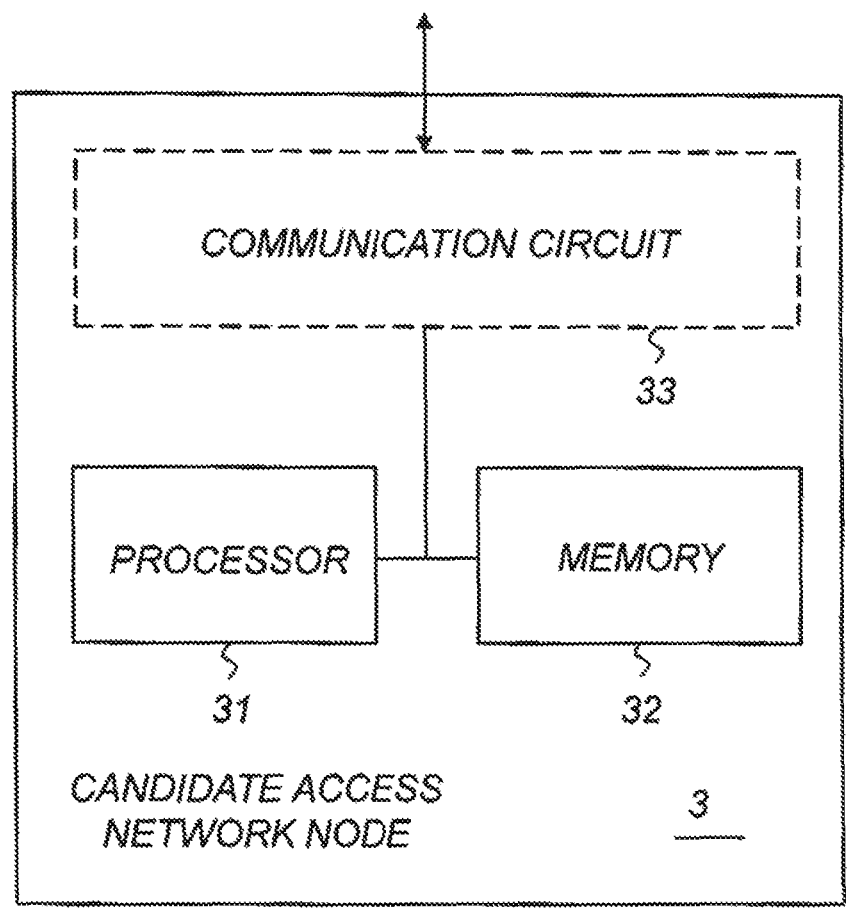
FIG. 9 is a block diagram illustrating a particular embodiment of a candidate access network node according to the proposed technology

FIG. 9 is a schematic block diagram illustrating an example of a candidate access network node 3, based on a processor-memory implementation according to an embodiment. In this particular example, the candidate access network node 3 comprises a processor 31 and a memory 32, the memory 32 comprising instructions executable by the processor 31, whereby the processor is operative to control the operation of the candidate access network node.

Figure 12:
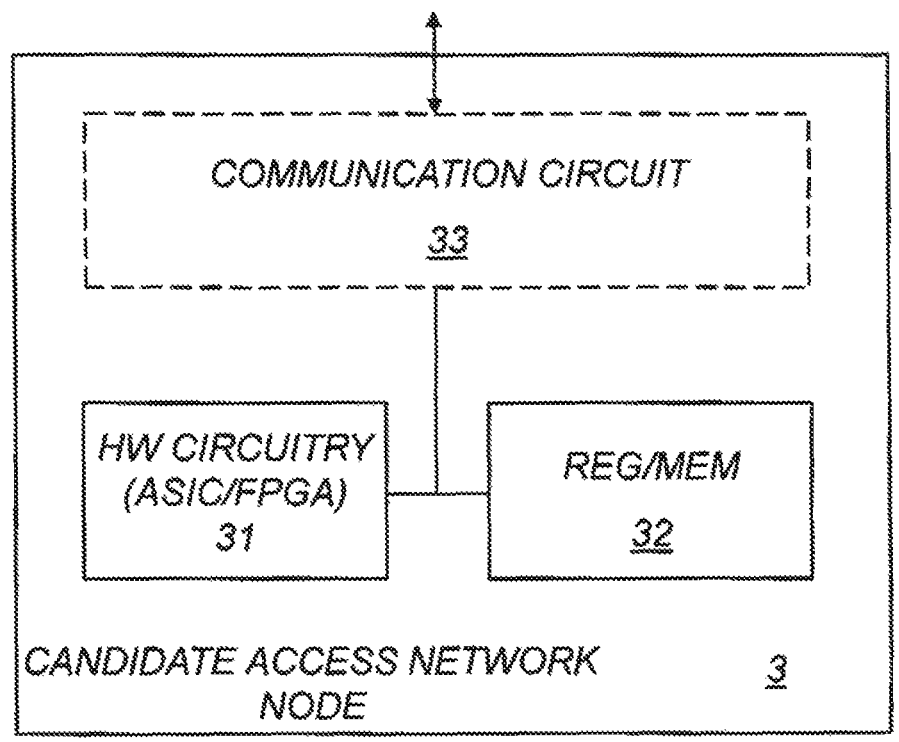
FIG. 12 is a block diagram illustrating an alternative embodiment a candidate access network node according to the proposed technology.

FIG. 12 is a schematic block diagram illustrating another example of a candidate access network node 3, based on a hardware circuitry implementation according to an embodiment. Particular examples of suitable hardware circuitry 31 include one or more suitably configured or possibly reconfigurable electronic circuitry, e.g. Application Specific Integrated Circuits ASICs, Field Programmable Gate Arrays FPGAs, or any other hardware logic such as circuits based on discrete logic gates and/or flip-flops interconnected to perform specialized functions in connection with suitable registers REG and/or memory units MEM 32.

Optionally, the candidate access network node 3 may also include a communication circuit 33. The communication circuit 33 may include functions for wired and/or wireless communication with other devices and/or network nodes in the network. In a particular example, the communication circuit 33 may be based on radio circuitry for communication with one or more other nodes, including transmitting and/or receiving information. The communication circuit 33 may be interconnected to the processor 31 and/or memory 32. The communication circuit 33 may be interconnected to the hardware circuitry 31 and/or REG/MEM 32. By way of example, the communication circuit 33 may include any of the following: a receiver, a transmitter, a transceiver, input/output I/O circuitry, input ports and/or output ports.

It is also possible to provide a solution based on a combination of hardware and software. The actual hardware-software partitioning can be decided by a system designer based on a number of factors including processing speed, cost of implementation and other requirements.

FIG. 14 is a schematic diagram illustrating an example of a computer-implementation 400 according to an embodiment. In this particular example, at least some of the steps, functions, procedures, modules and/or blocks described herein are implemented in a computer program 425; 435, which is loaded into the memory 420 for execution by processing circuitry including one or more processors 410. The processors 410 and memory 420 are interconnected to each other to enable normal software execution. An optional input/output device 440 may also be interconnected to the processors 410 and/or the memory 420 to enable input and/or output of relevant data such as input parameters and/or resulting output parameters. The term 'processor' should be interpreted in a general sense as any system or device capable of executing program code or computer program instructions to perform a particular processing, determining or computing task.

The processing circuitry including one or more processors 410 is thus configured to perform, when executing the computer program 425, well-defined processing tasks such as those described herein.

The processing circuitry does not have to be dedicated to only execute the above-described steps, functions, procedure and/or blocks, but may also execute other tasks.

In a particular embodiment, the computer program 325; 335 comprises instructions, which when executed by at least one processor 410, cause the processors 410 to:

read a representation of a first uplink resource, the uplink resource to be used by a User Equipment 2, UE 2, for the transmission of a signal for a candidate access network node 3 to perform measurements on; and output a message to be transmitted to a source access network node 1 specifying whether the measurement on the uplink resource was performed to enable the source access network node 1 to provide a representation of a second uplink resource based on the message.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

Having described embodiments of the source access network node and candidate access network node, below will follow various embodiments of a User Equipment that may be used to perform the corresponding method. To this end, as used herein, the non-limiting term "User Equipment, UE", may refer to a mobile phone, a cellular phone, a Personal Digital Assistant PDA, equipped with radio communication capabilities, a smart phone, a laptop or Personal Computer PC, equipped with an internal or external mobile broadband modem, a tablet with radio communication capabilities, a target device, a device to device UE, a machine type UE or UE capable of machine to machine communication, Customer Premises Equipment CPE, Laptop Embedded Equipment LEE, Laptop Mounted Equipment LME, USB dongle, a portable electronic radio communication device, a sensor device equipped with radio communication capabilities or the like. In particular, the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication. The proposed technology provides such a User Equipment, UE 2. The UE 2 is configured to receive, from a source access network node 1 serving the UE 2, a representation of an uplink resource. The UE 2 is also configured to transmit, using the uplink resource, a signal for a candidate access network node 3 to perform measurements on.

According to a particular embodiment of the proposed technology there is provided a UE 2 that is configured to transmit, using the uplink resource, a signal that comprises information specifying an identity feature of the UE 2.

According to a particular embodiment of the proposed technology there is provided a UE 2 wherein the identity feature comprises the identity of the cell in which the UE 2 is served.

According to a more specific embodiment of the proposed technology there is provided a UE 2 wherein the identity feature further comprises the identity of the UE 2.

According to an optional embodiment there is provided a UE 2 that is configured to transmit, using the uplink resource, a set of UL signal transmissions forming a beam sweep for a candidate access network node 3 to perform measurements on.

According to an alternative embodiment of the proposed technology there is provided a UE 2 that is configured to repeat the signal transmission a certain number of times. It may, for example, be configured to transmit in a periodic fashion based on the first uplink resource, or according to a predetermined transmission pattern that is initiated based on the first uplink resource. It should also be noted that a UE 2 that is configured to transmit the uplink signal by means of a UL beam sweep also might be configured to repeat the UL beam sweep according to a particular pattern based on the first uplink resource. The UL beam sweep may comprise successive repetitions of the same beam until the next beam in the sweep is transmitted, or repetition of full single transmission beam sweeps.

Figure 10:
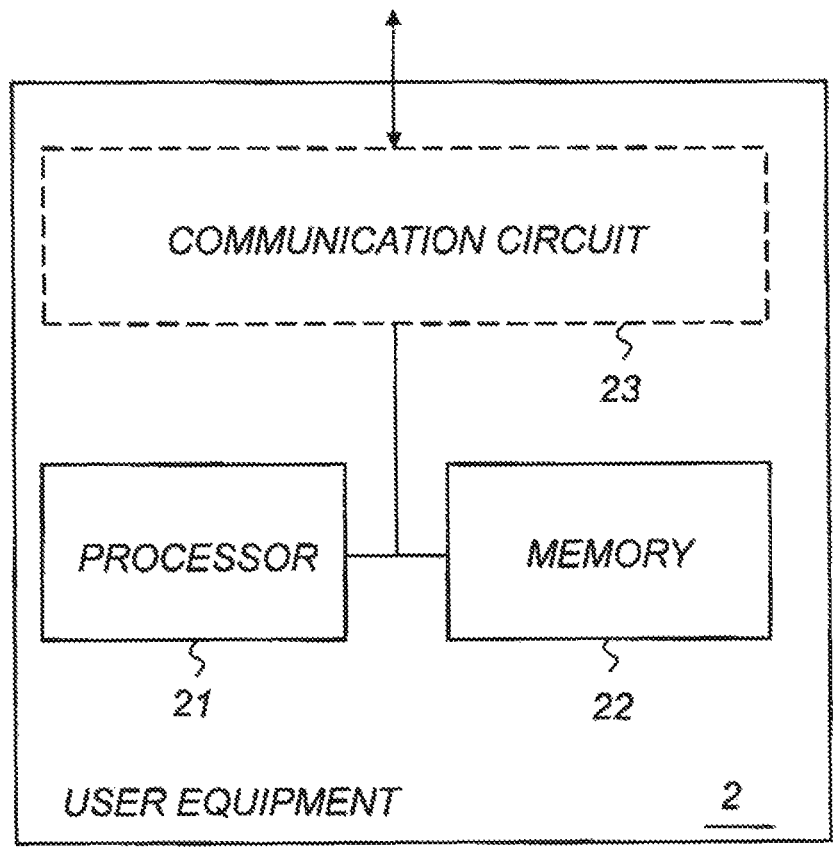
FIG. 10 is a block diagram illustrating a particular embodiment of a User Equipment according to the proposed technology

FIG. 10 is a schematic block diagram illustrating an example of a UE 2, based on a processor-memory implementation according to an embodiment. In this particular example, the UE 2 comprises a processor 21 and a memory 22, the memory 22 comprising instructions executable by the processor 21, whereby the processor is operative to control the operation of the UE 2.

Figure 13:
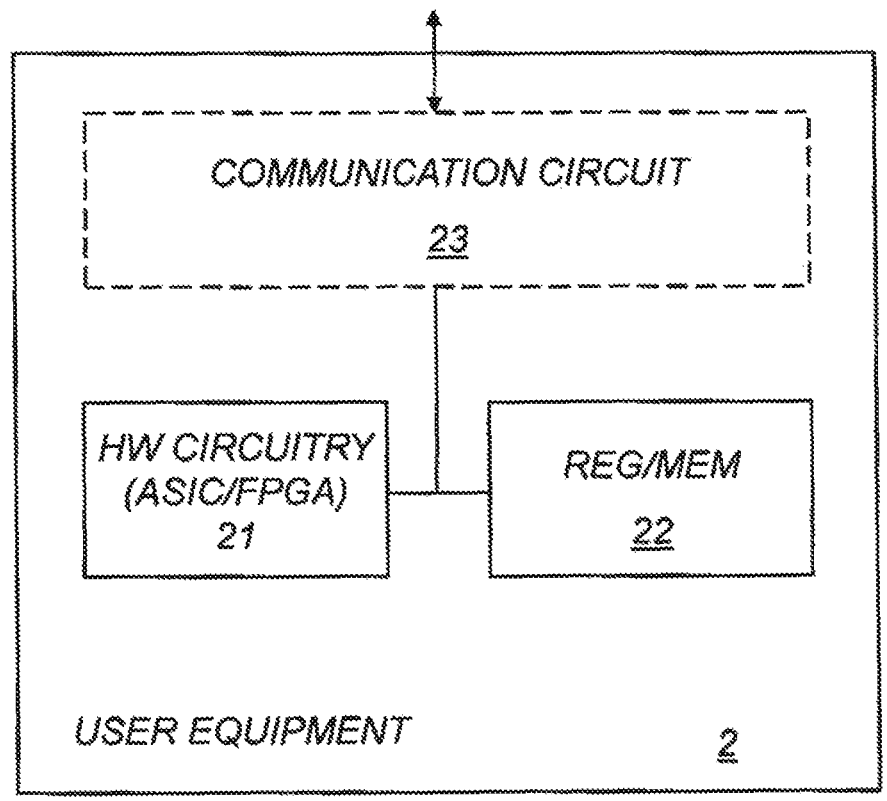
FIG. 13 is a block diagram illustrating an alternative embodiment of a User Equipment according to the proposed technology

FIG. 13 is a schematic block diagram illustrating another example of a UE 2, based on a hardware circuitry implementation according to an embodiment. Particular examples of suitable hardware circuitry 21 include one or more suitably configured or possibly reconfigurable electronic circuitry, e.g. Application Specific Integrated Circuits ASICs, Field Programmable Gate Arrays FPGAs, or any other hardware logic such as circuits based on discrete logic gates and/or flip-flops interconnected to perform specialized functions in connection with suitable registers REG and/or memory units MEM 22.

The UE 2 may also include a communication circuit 23. The communication circuit 23 may include functions for wired and/or wireless communication with other devices and/or network nodes in the network. In a particular example, the communication circuit 23 may be based on radio circuitry for communication with one or more other nodes, including transmitting and/or receiving information. The communication circuit 23 may be interconnected to the processor 21 and/or memory 22. The communication circuit 23 may be interconnected to the hardware circuitry 21 and/or REG/MEM 22. By way of example, the communication circuit 23 may include any of the following: a receiver, a transmitter, a transceiver, input/output I/O circuitry, input ports and/or output ports.

It is also possible to provide a solution based on a combination of hardware and software. The actual hardware-software partitioning can be decided by a system designer based on a number of factors including processing speed, cost of implementation and other requirements.

FIG. 14 is a schematic diagram illustrating an example of a computer-implementation 400 according to an embodiment. In this particular example, at least some of the steps, functions, procedures, modules and/or blocks described herein are implemented in a computer program 425; 435, which is loaded into the memory 420 for execution by processing circuitry including one or more processors 410. The processors 410 and memory 420 are interconnected to each other to enable normal software execution. An optional input/output device 440 may also be interconnected to the processors 410 and/or the memory 420 to enable input and/or output of relevant data such as input parameters and/or resulting output parameters.

The term 'processor' should be interpreted in a general sense as any system or device capable of executing program code or computer program instructions to perform a particular processing, determining or computing task.

The processing circuitry including one or more processors 410 is thus configured to perform, when executing the computer program 425, well-defined processing tasks such as those described herein.

The processing circuitry does not have to be dedicated to only execute the above-described steps, functions, procedure and/or blocks, but may also execute other tasks.

In a particular embodiment, the computer program 225; 235 comprises instructions, which when executed by at least one processor, cause the at least one processor to:

read a representation of an uplink resource; and control the transmission of a signal using the uplink resource, the signal to be transmitted for a candidate access network node 3 to perform measurements on.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 425; 435 may be realized as a computer program product, which is normally carried or stored on a computer-readable medium 420; 430, in particular a non-volatile medium. The computer-readable medium may include one or more removable or non-removable memory devices including, but not limited to a Read-Only Memory ROM, a Random Access Memory RAM, a Compact Disc CD, a Digital Versatile Disc DVD, a Blu-ray disc, a Universal Serial Bus USB memory, a Hard Disk Drive HDD storage device, a flash memory, a magnetic tape, or any other conventional memory device. The computer program may thus be loaded into the operating memory of a computer or equivalent processing device for execution by the processing circuitry thereof.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors DSPs, one or more Central Processing Units CPUs, video acceleration hardware, and/or any suitable programmable logic circuitry such as one or more Field Programmable Gate Arrays FPGAs, or one or more Programmable Logic Controllers PLCs.

It should also be understood that it may be possible to re-use the general processing capabilities of any conventional device or unit in which the proposed technology is implemented. It may also be possible to re-use existing software, e.g. by reprogramming of the existing software or by adding new software components.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 15:
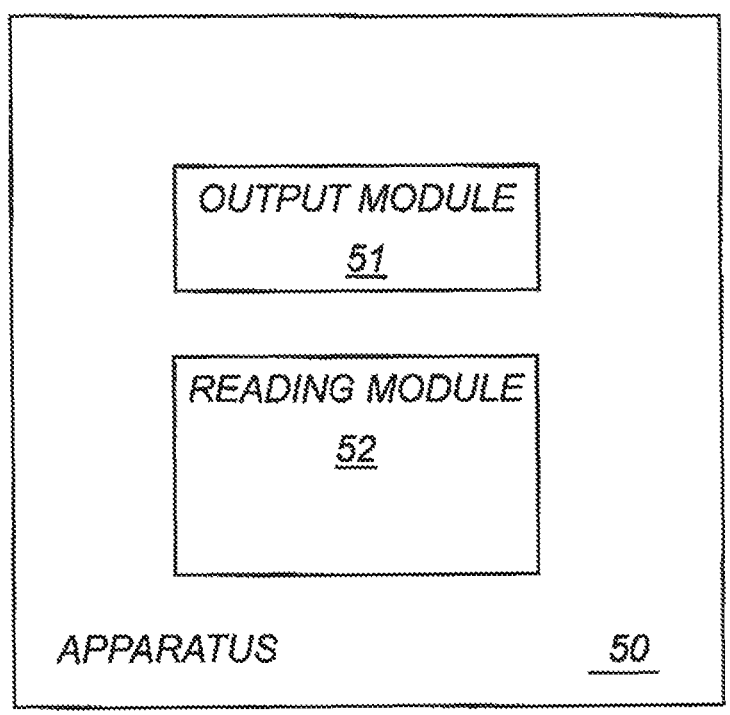
FIG. 15 is a diagram illustrating an apparatus for controlling an uplink measurement procedure according to the proposed technology.

FIG. 15 is a schematic diagram illustrating an example of an apparatus 50 for controlling an uplink measurement procedure for signals transmitted from a User Equipment 2, UE 2, to at least one candidate access network node 3. The apparatus comprises:

an output module 51 for outputting a first representation of an uplink resource to be provided to a UE 2 and at least one candidate access network node 3;

a reading module 52 for reading an indication specifying whether a measurement was performed by a specific candidate access network node 3 on a signal transmitted using the uplink resource; and an output module 51 for outputting, based on the indication, a second representation of an uplink resource to be provided to a UE 2 and at least one candidate access network node 3.

Figure 16:
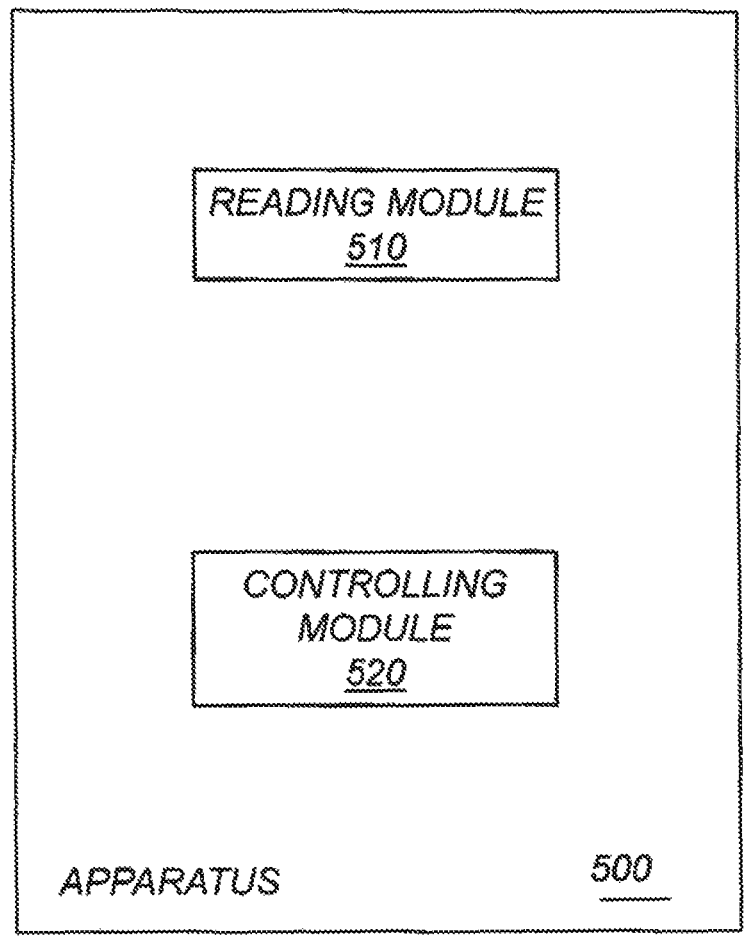
FIG. 16 is a diagram illustrating an apparatus for controlling the operation a User Equipment according to the proposed technology.

FIG. 16 is a schematic diagram illustrating an example of an apparatus 500 for controlling the operation a User Equipment 2. The apparatus comprises:

a reading module 510 for reading a representation of an uplink resource; and a controlling module 520 for controlling the transmission of a signal using the uplink resource, the signal to be transmitted for a candidate access network node 3 to perform measurements on.

Figure 17:
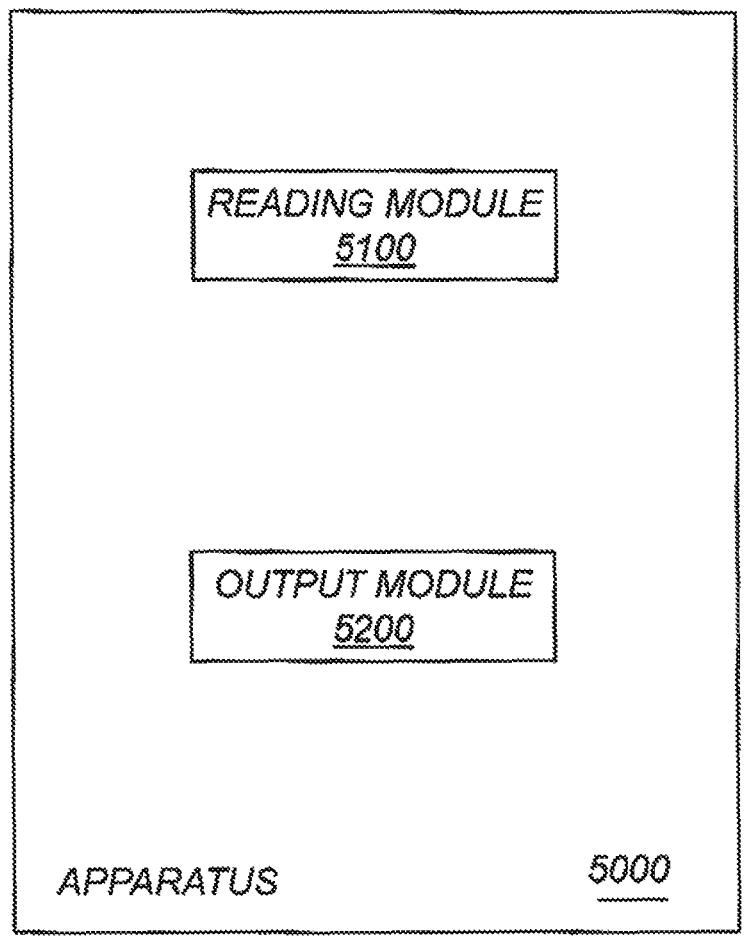
FIG. 17 is a diagram illustrating an apparatus for controlling the operation of a candidate access network node according to the proposed technology.

FIG. 17 is a schematic diagram illustrating an example of an apparatus 5000 for controlling the operation of a candidate access network node, wherein the apparatus comprises:

a reading module 5100 for reading a representation of a first uplink resource, the uplink resource to be used by a User Equipment 2, UE 2, for the transmission of a signal for a candidate access network node 3 to perform measurements on; and an output module 5200 for outputting a message to be transmitted to a source access network node 1 specifying whether the measurement on the uplink resource was performed to enable the source access network node 1 to provide a representation of a second uplink resource based on the message.

Alternatively it is possible to realize the modules in FIGS. 15-17 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits ASICs as previously mentioned. Other examples of usable hardware include input/output I/O circuitry and/or circuitry for receiving and/or sending signals. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

ABBREVIATIONS USED

GSM Global System for Mobile communications
BCCH Broadcast Control Channel

WCDMA Wideband Code Division Multiple Access
CPICH Common Pilot Channel
LTE Long Term Evolution
CRS Cell-specific Reference Signal

The invention claimed is:

1. A method performed by a source access network node in a wireless communication network for controlling an uplink measurement procedure for signals transmitted from a User Equipment (UE) to at least one candidate access network node, the method comprises:
providing a first representation of a first uplink resource to the UE and the at least one candidate access network node, the first uplink resource to be used for transmission of a signal by the UE for the at least one candidate access network node to perform measurements on;
receiving, from a specific candidate access network node of the at least one candidate access network node, an indication that no measurement was performed by the specific candidate access network node on the signal transmitted using the first uplink resource; and
providing, based on the indication that no measurement was performed by the specific candidate access network node on the signal transmitted using the first uplink resource, a second representation of a second uplink resource to the UE and to the specific candidate access network node.

2. The method according to claim 1, wherein the indication that no measurement was performed is obtained from a message, provided by the specific candidate access network node, specifying that no measurement was performed.

3. The method according to claim 2, wherein the message also comprises a suggestion of at least one uplink resource allocation that is suitable as an allocation for the second uplink resource for the specific candidate access network node to enable the source access network node to provide the second representation of the second uplink resource based on the suggestion.

4. The method according to claim 1, wherein the indication that no measurement was performed comprises an indication that no response relating to a measurement of a signal transmitted using the uplink resource was obtained from the specific candidate access network node within a pre-determined time limit.

5. The method according to claim 1, wherein the method is performed until a measurement report relating to the measurement of a signal transmitted using the provided representation of an uplink resource has been received from each of the at least one candidate access network node of at least a specified subset of the candidate access network nodes.

6. The method according to claim 1, wherein the providing the first representation of the first uplink resource to the UE and the at least one candidate access network node comprises providing the first representation of the first uplink resource that has been negotiated between the source access network node and the at least one candidate access network nodes.

7. The method according to claim 1, wherein the method further comprises performing measurements on the signal transmitted by the UE using the first uplink resource in order to determine quality of a radio link between the source access network node and the UE.

8. The method according to claim 1, wherein
the controlling ensures that at least a subset of the at least one candidate access network node is able to perform measurements on an uplink resource, the method further comprising:
collecting measurement reports from the subset of the at least one candidate access network node; and
selecting, based at least partially on the measurement reports, a target access network node for the UE to establish a radio link with during handover.

9. The method according to claim 8, wherein the selecting the target access network node is further based on measurements of quality of a radio link between the source access network node and the UE.

10. The method according to claim 9, wherein the selecting a target access network node comprises:
comparing quality indicated by the collected measurement reports with the quality of the radio link between the source access network node and the UE,
wherein a particular candidate access network node of the at least one candidate access network node may be selected as the target access network node if the quality of the radio link between the particular candidate access network node and the UE is better than the quality of the radio link between the source access network node and the UE.

11. A source access network node configured to control an uplink measurement procedure for signals transmitted from a User Equipment (UE) to at least one candidate access network node, wherein:
the source access network node is configured to provide a first representation of a first uplink resource to the UE and the at least one candidate access network node, the first uplink resource to be used for transmission of a signal by the UE for the at least one candidate access network node to perform measurements on; and
the source access network node is configured to receive, from a specific candidate access network node of the at least one candidate access network node, an indication that no measurement was performed by the specific candidate access network node on the signal transmitted using the first uplink resource; and
the source access network node is configured to provide, based on the indication that no measurement was performed by the specific candidate access network node on the signal transmitted using the uplink resource, a second representation of a second uplink resource to the UE and to the specific candidate access network node.

12. The source access network node according to claim 11, wherein the source access network node is configured to obtain the indication that no measurement was performed from a message, provided by the specific candidate access network node, specifying that no measurement was performed.

13. The source access network node according to claim 12, wherein the message also comprises a suggestion of at least one uplink resource allocation that is suitable as an allocation for the second uplink resource for the specific candidate access network node and wherein the source access network node is configured to provide the second representation of the second uplink resource based on the suggestion.

14. The source access network node according to claim 11, wherein the source access network node is configured to provide the first representation of first uplink resource to the UE and the at least one candidate access network node,
where the first uplink resource has been negotiated between the source access network node and the at least one candidate access network node.

15. The source access network node according to claim 11, wherein the source access network node is configured to perform measurements on the signal transmitted by the UE using the first uplink resource in order to determine the quality of a radio link between the source access network node and the UE.

16. The source access network node according to claim 11, wherein:
  the source access network node is further configured to collect measurement reports from the subset of the at least one candidate access network node; and
  the source access network node is further configured to select, based at least partially on the measurement reports, a target access network node for the UE to establish a radio link with during handover.

17. The source access network node according to claim 16, wherein the source access network node is also configured to select the target access network node based on measurements of the quality of the radio link between the source access network node and the UE.

18. The source access network node according to claim 17, wherein the source access network node is configured to select the target access network node by comparing quality indicated by the collected measurement reports with the quality of a radio link between the source access network node and the UE,
  wherein a particular candidate access network node of the at least one candidate access network node may be selected as the target access network node if the quality of the radio link between the particular candidate access network node and the UE is better than the quality of the radio link between the source access network node and the UE.

19. A non-transitory computer readable medium having computer program instructions stored thereon, which when executed by at least one processor, cause the at least one processor to:
  output a first representation of a first uplink resource to be provided to a user equipment (UE) and at least one candidate access network node; and
  receive an indication specifying whether a measurement was performed by a specific candidate access network node of the at least one candidate access network node on the signal transmitted using the uplink resource; and
  output, based on an indication that no measurement was performed by the specific candidate access network node on the signal transmitted using the first uplink resource, a second representation of a second uplink resource to be provided to the UE and to the specific candidate access network node.

20. An apparatus for controlling an uplink measurement procedure for signals transmitted from a User Equipment, UE, to at least one candidate access network node, wherein the apparatus comprises:
  output circuitry configured to output a first representation of a first uplink resource to be provided to the UE and the at least one candidate access network node;
  receive circuitry configured to receive an indication specifying whether a measurement was performed by a specific candidate access network node of the at least one candidate access network node on a signal transmitted using the first uplink resource; and
  wherein the output circuitry is further configured to output, based on the indication that no measurement was performed by the specific candidate access network node on the signal transmitted using the first uplink resource, a second representation of a second uplink resource to be provided to the UE and the specific candidate access network node.

* * * * *